(12) United States Patent
Park

(10) Patent No.: US 12,720,178 B2
(45) Date of Patent: Aug. 25, 2026

(54) CAMERA ACTUATOR AND CAMERA DEVICE COMPRISING A BOARD EXTENDING ALONG THE CAMERA ACTUATOR

(71) Applicant: LG INNOTEK CO., LTD., Seoul (KR)

(72) Inventor: Jae Keun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 34 days.

(21) Appl. No.: 18/293,845

(22) PCT Filed: Aug. 8, 2022

(86) PCT No.: PCT/KR2022/011769
§ 371 (c)(1),
(2) Date: Jan. 31, 2024

(87) PCT Pub. No.: WO2023/018144
PCT Pub. Date: Feb. 16, 2023

(65) Prior Publication Data

US 2024/0380958 A1 Nov. 14, 2024

(30) Foreign Application Priority Data

Aug. 9, 2021 (KR) ........................ 10-2021-0104539

(51) Int. Cl.
*H04N 23/54* (2023.01)
*H04N 23/68* (2023.01)

(52) U.S. Cl.
CPC ........... *H04N 23/54* (2023.01); *H04N 23/687* (2023.01)

(58) Field of Classification Search
CPC ...... H04N 23/54; H04N 23/687; H04N 23/55; H04N 23/57; H04N 23/60;
(Continued)

(56) References Cited

U.S. PATENT DOCUMENTS

2017/0214831 A1* 7/2017 Ha ........................ H04N 23/55
2018/0188474 A1* 7/2018 Enta ...................... H04N 23/00
(Continued)

FOREIGN PATENT DOCUMENTS

JP 2014-216973 11/2014
KR 20190089600 A * 7/2019 ............ H04N 23/55
(Continued)

OTHER PUBLICATIONS

European Search Report dated Nov. 4, 2024 issued in Application No. 22856142.9.

(Continued)

*Primary Examiner* — Padma Haliyur
(74) *Attorney, Agent, or Firm* — KED & ASSOCIATES, LLP

(57) ABSTRACT

One embodiment of the present invention discloses a camera device comprising: a first actuator including a first substrate having a first terminal part; a second actuator coupled to the first actuator and including a second substrate and a third substrate; and a main substrate having a first unit main board on which an image sensor is disposed, a second unit main board which is arranged to correspond to the first substrate, and a third unit main board which is arranged to correspond to the third substrate, wherein the third substrate includes at least one of a second terminal part and a third terminal part, and the third unit main board is soldered to the at least one of the second terminal part and the third terminal part.

14 Claims, 27 Drawing Sheets

(58) Field of Classification Search
CPC .... G03B 2205/0023; G03B 2205/0069; G03B 3/10; G03B 30/00; G03B 5/00; G03B 13/36; G03B 2205/0007
See application file for complete search history.

(56) References Cited

U.S. PATENT DOCUMENTS

| | | | | |
|---|---|---|---|---|
| 2018/0364450 | A1* | 12/2018 | Lee | H04N 23/55 |
| 2019/0361323 | A1* | 11/2019 | Jerby | H04N 23/51 |
| 2020/0050014 | A1* | 2/2020 | Park | G02B 7/08 |
| 2020/0351421 | A1 | 11/2020 | Park et al. | |
| 2021/0022247 | A1* | 1/2021 | Ha | H05K 1/145 |
| 2021/0044731 | A1* | 2/2021 | Song | G02B 7/02 |
| 2022/0014653 | A1* | 1/2022 | Jang | G02B 27/646 |

FOREIGN PATENT DOCUMENTS

| | | | | |
|---|---|---|---|---|
| KR | 10-2019-0128279 | | 11/2019 | |
| KR | 10-2020-0055240 | | 5/2020 | |
| KR | 10-2020-0062128 | | 6/2020 | |
| KR | 10-2020-0117044 | | 10/2020 | |
| KR | 10-2020-0122166 | | 10/2020 | |
| KR | 10-2021-0088351 | | 7/2021 | |
| WO | WO-2018130898 | A1 * | 7/2018 | H04N 23/55 |
| WO | WO-2020101232 | A1 * | 5/2020 | G02B 7/102 |

OTHER PUBLICATIONS

International Search Report dated Nov. 10, 2022 issued in Application No. PCT/KR2022/011769.
Japanese Office Action dated May 12, 2026 issued in Application No. 2024-507007.

* cited by examiner

CAMERA ACTUATOR AND CAMERA DEVICE COMPRISING A BOARD EXTENDING ALONG THE CAMERA ACTUATOR

CROSS-REFERENCE TO RELATED PATENT APPLICATIONS

This application is a U.S. National Stage Application under 35 U.S.C. § 371 of PCT Application No. PCT/KR2022/011769, filed Aug. 8, 2022, which claims priority to Korean Patent Application No. 10-2021-0104539, filed Aug. 9, 2021, whose entire disclosures are hereby incorporated by reference.

TECHNICAL FIELD

The present invention relates to a camera actuator and a camera device including the same.

BACKGROUND ART

A camera is a device for taking pictures or videos by capturing images of subjects and is mounted on mobile devices, drones, vehicles, or the like. A camera device or a camera module may have an image stabilization (IS) function of correcting or preventing the image shake caused by a user's motion, an auto focusing (AF) function of aligning a focal length of a lens by automatically adjusting a distance between an image sensor and the lens, and a zooming function of capturing an image of a remote subject by increasing or decreasing the magnification of the remote subject through a zoom lens in order to improve the quality of the image.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to a general OIS technique, the motion of the camera may be detected through a gyro sensor or the like, and a lens may tilt or move, or a camera device including a lens and an image sensor may tilt or move based on the detected motion. When the lens or the camera device including the lens and the image sensor tilts or moves for an OIS, it is necessary to additionally secure a space for tilting or moving around the lens or camera device.

Meanwhile, an actuator for an OIS may be disposed around the lens. In this case, the actuator for an OIS may include actuators, which are in charge of tilting of two axes perpendicular to an optical axis Z, that is, an actuator in charge of an X-axis tilting and an actuator in charge of a Y-axis tiling.

However, according to the needs of ultra-slim and ultra-small camera devices, there is a large space constraint for arranging the actuator for an OIS, and it may be difficult to ensure a sufficient space where the lens or camera device including the lens and the image sensor itself may tilt or move for an OIS. In addition, as the camera has a higher pixel density, it is preferable that a size of the lens be increased to increase the amount of received light, and there may be a limit to increasing the size of the lens due to a space occupied by the actuator for an OIS.

In addition, when the zooming function, the AF function, and the OIS function are all included in the camera device, there is a problem that an OIS magnet and an AF or zoom magnet are disposed close to each other to cause magnetic field interference.

In addition, there is a problem in that reliability of the electrical connection between boards in the camera device is degraded due to an impact or the like.

DISCLOSURE

Technical Problem

The present invention is directed to providing a camera actuator and a camera device, which have a circuit board with electrical connection with improved reliability even against an impact or the like.

In addition, the present invention is directed to providing a camera device having electrical connection between boards to facilitate a circuit design.

In addition, the present invention is directed to providing a camera actuator and a camera device applicable to ultra-slim, ultra-small, and high-resolution cameras.

In addition, the present invention is directed to providing a camera actuator and a camera device, which improve a moving distance of a lens assembly through a shape of a driving coil.

The objects of embodiments are not limited thereto and may also include objects or effects that may be identified from the configurations or embodiments to be described below.

Technical Solution

A camera device according to an embodiment of the present invention includes a first actuator including a first board having a first terminal part, a second actuator coupled to the first actuator and including a second board and a third board, and a main board including a first unit main board on which an image sensor is disposed, a second unit main board disposed to correspond to the first board, and a third unit main board disposed to correspond to the third board, wherein the third board includes at least one of a second terminal part and a third terminal part, and the third unit main board is soldered to at least one of the second terminal part and the third terminal part.

The second terminal part may be disposed on the second board, and the third terminal part may be disposed on the third board.

The second unit main board may include a first main terminal part coupled to the first terminal part.

The third unit main board may include a third main terminal part soldered to the third terminal part.

The second unit main board may include a second main terminal part soldered to the second terminal part.

The third unit main board may include a second main terminal part soldered to the second terminal part.

The camera device according to an embodiment includes a first actuator including a first board having a first terminal part, a second actuator coupled to the first actuator and including a second board having a second terminal part, and a main board including a first unit main board on which an image sensor is disposed, and a second unit main board bent at the first unit main board and disposed on the first board of the first actuator, wherein the second unit main board includes a first main terminal part formed at a position corresponding to the first terminal part, and a second main terminal part formed at a position corresponding to the second terminal part, the first main terminal part is electrically coupled to the first terminal part, the second main terminal part is electrically coupled to the second terminal part, and the second unit main board is disposed on first side portions of the first actuator and the second actuator.

The camera device may include a third unit main board facing the second unit main board, wherein the third unit main board may be disposed on a second side portion of the first actuator.

The first main terminal part may be positioned on a surface opposite to a surface facing an outer surface of the first side portion of the first actuator, and the second main terminal part may be positioned on a surface opposite to a surface facing an outer surface of the first side portion of the second actuator.

The first actuator may be coupled to a prism, and the second actuator may be coupled to a lens.

The second main terminal part may include a groove exposing a portion of the second terminal part.

The camera device may include an electrically conductive member electrically connecting the second main terminal part to the second terminal part.

The electrically conductive member may be coupled to the second main terminal part, a bonding groove of the second main terminal part, and the second terminal part.

The first main terminal part may be electrically coupled to the first terminal part.

The first main terminal part may be connected to the first terminal part by a connector.

The second unit main board may include a second side surface area in contact with the first board unit in the optical axis direction, a first side surface area in contact with the second board part in the optical axis direction, and a connecting area disposed between the first side surface area and the second side surface area.

The connecting area may be formed of a flexible printed circuit board and may have a step inward.

An area of the second unit main board overlapping the second board may be larger than an area of the second unit main board not overlapping the second board.

A camera module according to another embodiment includes a first camera actuator, a second camera actuator coupled to the first camera actuator, and a main board unit on which an image sensor is mounted and which surrounds side surfaces of the second camera actuator, wherein the second camera actuator includes a second board unit disposed on side surfaces thereof, the second board unit has a first exposed area exposed by the main board unit, and the main board unit includes a second main terminal part (or a third main terminal part) disposed outside the second board unit and disposed along the first exposed area.

The main board unit may include a first unit main board overlapping the second camera actuator along an optical axis, and second and third unit main boards extending from the first unit main board to the side surfaces of the second camera actuator.

The second and third unit main boards may have a larger thickness in a vertical direction than the second board unit in at least some areas.

The second and third unit main boards may include a board inner surface facing the second board unit, and a board outer surface that is a surface opposite to the board inner surface.

The second main terminal part (or the third main terminal part) may be disposed on the board outer surface.

The second main terminal part (or the third main terminal part) may be disposed on the board inner surface.

The second board unit may include a second terminal part (or a third terminal part) overlapping at least a portion of the second main terminal part (or the third main terminal part) in a vertical direction.

The second main terminal part (or the third main terminal part) may be disposed outside the second terminal part (or the third terminal part).

The second terminal part (or the third terminal part) may be disposed in the first exposed area and a first unexposed area that is an area other than the first exposed area.

A length of the second terminal part (or the third terminal part) may be smaller than a length of the second main terminal part (or the third main terminal part).

The second and third unit main boards may include a second unit main board and a third unit main board facing each other with respect to the optical axis.

At least one of the second unit main board and the third unit main board may extend to surround the first camera actuator.

The first camera actuator may include a first board unit disposed on side surfaces thereof.

The first board unit may have a second exposed area exposed by the main board unit, and the main board unit may include a first main terminal part disposed outside the first board unit and disposed along the second exposed area.

The second and third unit main boards may include a first side surface area in contact with the second board unit in the optical axis direction, a second side surface area in contact with the first board part in the optical axis direction, and a connecting area disposed between the first side surface area and the second side surface area.

The connecting area may be formed of a flexible printed circuit board and may have a step inward.

The first board unit may include a first terminal part overlapping at least a portion of the first main terminal part in a vertical direction.

The first main terminal part may be disposed outside the first terminal part.

The first terminal part may be disposed in the second exposed area and a second unexposed area that is an area other than the second exposed area.

At least a portion of the first main terminal part may overlap the second main terminal part (or the third main terminal part) in the optical axis direction.

Advantageous Effects

According to embodiments of the present invention, it is possible to implement a camera actuator and a camera device, which have a circuit board with electrical connection with improved reliability even against an impact or the like.

In addition, according to the present invention, it is possible to implement a camera device having electrical connection between boards to facilitate a circuit design.

In addition, by reducing an area in which electrical connection between boards is made in a camera device including a plurality of actuators, it is possible to reduce a bonding process.

In addition, it is possible to implement a camera device with an improved bonding process by forming bonding grooves (e.g., pads) in both surfaces.

In addition, it is possible to implement a camera actuator and a camera device applicable to ultra-slim, ultra-small, and high-resolution cameras.

In particular, it is possible to effectively arrange an actuator for an optical image stabilizer (OIS) even without increasing the overall size of the camera device.

According to the embodiments of the present invention, it is possible to implement an X-axis tilting and a Y-axis tilting with a stable structure without causing magnetic field interference between the X-axis tilting and the Y-axis tilting and prevent magnetic field interference with an AF actuator or a zoom actuator, thereby achieving a precise OIS function.

According to the present invention, it is possible to implement a camera actuator and a camera device applicable to ultra-slim, ultra-small, and high-resolution cameras.

Various and beneficial advantages and effects of the present invention are not limited to the above-described contents and will be more readily understood in a process of describing specific embodiments of the present invention.

MODES OF THE INVENTION

Figure 1:
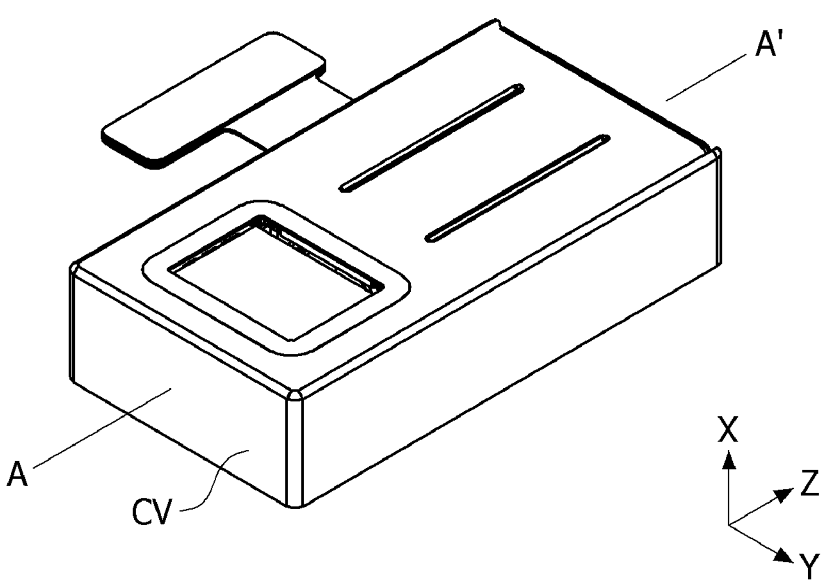
FIG. 1 is a perspective view of a camera device according to an embodiment.

Since the present invention may have various changes and various embodiments, specific embodiments are illustrated and described in the accompanying drawings.

However, it should be understood that this is not intended to limit the present invention to specific embodiments and includes all modifications, equivalents, and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms "comprise" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
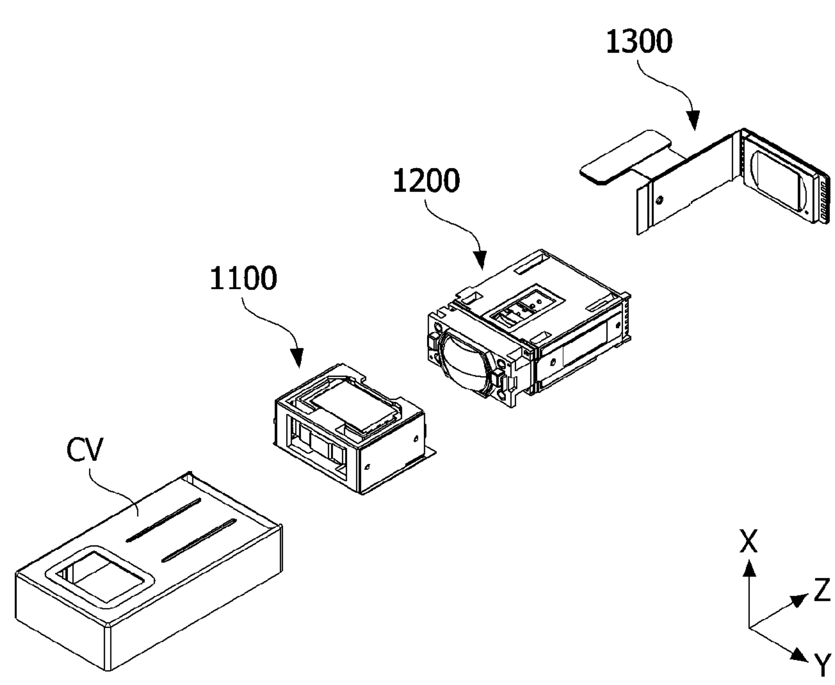
FIG. 2 is an exploded perspective view of the camera device according to the embodiment.
Figure 3:
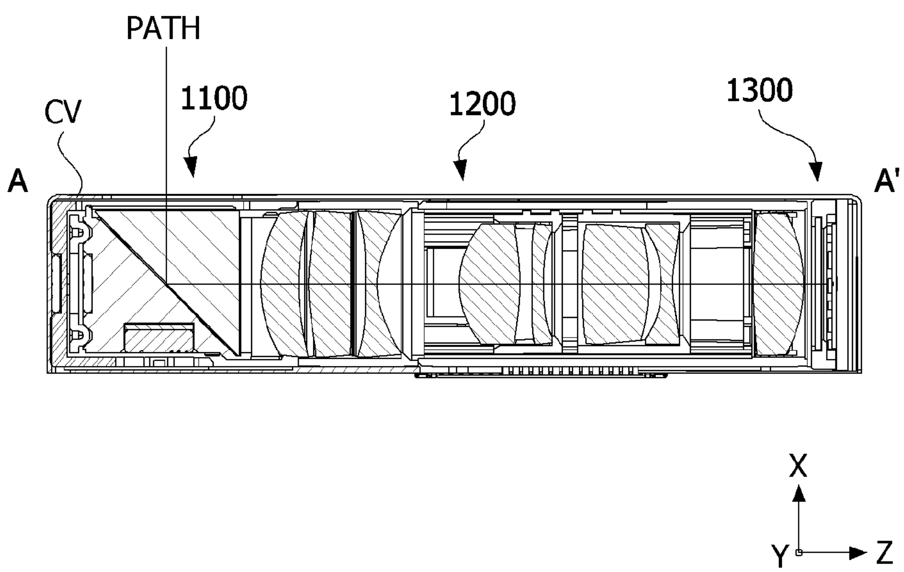
FIG. 3 is a cross-sectional view along line A-A' in FIG. 1.

FIG. 1 is a perspective view illustrating a camera device according to an embodiment, FIG. 2 is an exploded perspective view of the camera device according to the embodiment, and FIG. 3 is a cross-sectional view along line A-A' in FIG. 1.

Referring to FIGS. 1 and 2, a camera device 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and/or the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

In an embodiment, the first camera actuator 1100 may change an optical path. In an embodiment, the first camera actuator 1100 may vertically change the optical path through an internal optical member (e.g., a prism or a mirror). With this configuration, even when a thickness of a mobile terminal decreases, a configuration of a lens that is larger than the thickness of the mobile terminal is disposed in the mobile terminal so that magnification, auto focusing (AF), and OIS functions may be performed through the change in the optical path.

The first camera actuator 1100 may change the optical path from a first direction to a third direction. In the specification, an optical axis direction is a third direction or a Z-axis direction and corresponds to a traveling direction of light provided to an image sensor.

Additionally, the first camera actuator 1100 may include a lens disposed in a predetermined barrel (not illustrated). For example, the lens may include a fixed focal length lens. The fixed focal length lens may be referred to as "single focal length lens" or "single lens."

The second camera actuator 1200 may be disposed at a rear end of the first camera actuator 1100. The second camera actuator 1200 may be coupled to the first camera actuator 1100. In addition, the mutual coupling may be performed in any of various methods.

In addition, the second camera actuator 1200 may be a zoom actuator or an AF actuator. For example, the second camera actuator 1200 may support one or more lenses and perform an AF function or a zooming function by moving the lenses according to a predetermined control signal of a control unit.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

The circuit board 1300 may be connected to a second housing of the second camera actuator 1200 and may be provided with an image sensor. Furthermore, a base unit including a filter may be seated on the circuit board 1300. A description thereof will be made below.

The camera device according to the embodiment may be formed of one camera device or a plurality of camera devices. For example, the plurality of camera devices may include a first camera device and a second camera device. In addition, as described above, the camera device may be used interchangeably with "camera module," "camera device," "imaging device," "imaging module," "imaging machine," or the like.

In addition, the first camera device may include one actuator or a plurality of actuators. For example, the first camera device may include the first camera actuator 1100 and the second camera actuator 1200.

In addition, the second camera device may include an actuator (not illustrated) disposed in a predetermined housing (not illustrated) and capable of driving a lens unit. Although the actuator may be a voice coil motor, a micro actuator, a silicon actuator, or the like and applied in various methods such as an electrostatic method, a thermal method, a bimorph method, and an electrostatic force method, the present invention is not limited thereto. In addition, in the specification, the camera actuator may be referred to as "actuator," or the like. In addition, the camera device formed of the plurality of camera devices may be mounted in various electronic devices such as a mobile terminal.

Referring to FIG. 3, the camera device according to the embodiment may include the first camera actuator 1100 for performing the OIS function and the second camera actuator 1200 for performing the zooming function and the AF function.

Light may enter the camera device through an opening area positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and enter an image sensor IS positioned at one end of the second camera actuator 1200 (PATH).

In the specification, a lower surface refers to one side in the first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. Detailed description thereof will be made below. In addition, hereinafter, the optical axis direction corresponds to the optical path and is the third direction (Z-axis direction) in the description of the second camera actuator 1200, and the second camera actuator 1200 will be described below based on this.

In addition, with this configuration, the camera device according to the embodiment may resolve the spatial limitations of the first camera actuator and the second camera actuator by changing the optical path. In other words, the camera device according to the embodiment may extend the optical path while minimizing the thickness of the camera device in response to the change in the optical path. Furthermore, it should be understood that the second camera actuator may provide a high range of magnification by controlling a focus or the like in the extended optical path.

In addition, the camera device according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, although the first lens assembly and the second lens assembly may be moving lenses that move through the coil, the magnet, and the guide pin, and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF or zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, or shaking correction.

Figure 4:
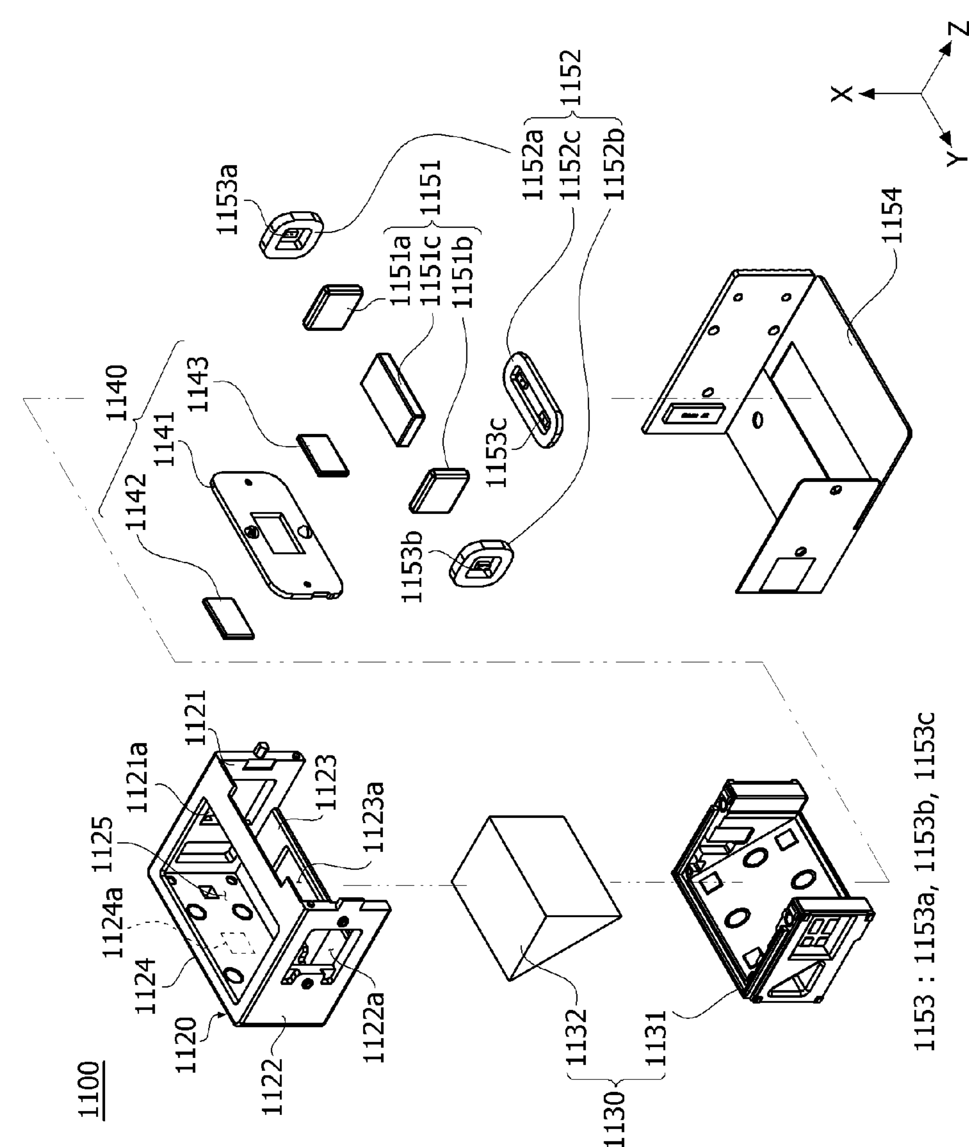
FIG. 4 is an exploded perspective view of a first camera actuator according to the embodiment.

FIG. 4 is an exploded perspective view of a first camera actuator according to the embodiment.

Referring to FIG. 4, the first camera actuator 1100 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnet 1142 having a coupling strength with the rotating plate 1141, and a second magnet 1143 positioned in the rotating plate 1141. In addition, the first driving unit 1150 includes a first driving magnet 1151, a first driving coil 1152, a first Hall sensor unit 1153, and a first board unit 1154.

The first shield can (not illustrated) may be positioned at an outermost side of the first camera actuator 1100 to surround the rotating unit 1140 and the first driving unit 1150, which will be described below.

The first shield can (not illustrated) can block or reduce electromagnetic waves generated from the outside. Therefore, it is possible to reduce the occurrence of malfunction in the rotating unit 1140 or the first driving unit 1150.

The first housing 1120 may be positioned inside the first shield can (not illustrated). In addition, the first housing 1120 may be positioned inside a first board unit 1154 to be described below. The first housing 1120 may be fastened by being fitted into or matched with the first shield can (not illustrated).

The first housing 1120 may be formed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124.

In addition, the third housing side portion 1123 may be a lower side portion of the first housing 1120 and may include a lower surface.

In addition, the first housing side portion 1121 may include a first housing hole 1121*a*. The first coil 1152*a* to be described below may be positioned in the first housing hole 1121*a*.

In addition, the second housing side portion 1122 may include a second housing hole 1122*a*. In addition, the second coil 1152*b* to be described below may be positioned in the second housing hole 1122*a*.

The first coil 1152*a* and the second coil 1152*b* may be coupled to the first board unit 1154. In the embodiment, the first coil 1152*a* and the second coil 1152*b* may be electrically connected to the first board unit 1154 so that a current may flow therebetween. The current is an element of an electromagnetic force capable of tilting the first camera actuator with respect to an X-axis.

In addition, the third housing side portion 1123 may include a third housing hole 1123*a*. A third coil 1152*c* to be described below may be positioned in the third housing hole 1123*a*. The third coil 1152*c* may be coupled to the first board unit 1154. In addition, the third coil 1152*c* may be electrically connected to the first board unit 1154 so that a current may flow therebetween. The current is an element of an electromagnetic force capable of tilting the first camera actuator with respect to a Y-axis.

The fourth housing side portion 1124 may include a first housing groove 1124*a*. The first magnet 1142 to be described below may be disposed in an area facing the first housing groove 1124*a*. Therefore, the first housing 1120 may be coupled to the rotating plate 1141 by a magnetic force or the like.

In addition, the first housing groove 1124*a* according to the embodiment may be positioned on an inner surface or an outer surface of the fourth housing side portion 1124. Therefore, the first magnet 1142 may also be disposed to correspond to a position of the first housing groove 1124*a*.

In addition, the first housing 1120 may include an accommodating part 1125 formed by the first to fourth housing side portions 1121 to 1124. The mover 1130 may be positioned in the accommodating part 1125.

The mover 1130 may include the holder 1131 and the optical member 1132 seated on the holder 1131.

The holder 1131 may be seated in an accommodating part 1125 of the first housing 1120. The holder 1131 may include a first prism outer surface to a fourth prism outer surface respectively corresponding to the first housing side portion 1121, the second housing side portion 1122, the third housing side portion 1123, and the fourth housing side portion 1124.

A seating groove in which the second magnet 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto. In addition, the optical member 1132 may reflect light reflected from the outside (e.g., an object) into the camera device. In other words, the optical member 1132 can resolve spatial limits of the first camera actuator and the second camera actuator by changing the path of the reflected light. Therefore, it should be understood that the camera device may provide a high range of magnification by extending the optical path while a thickness thereof is minimized.

The rotating unit 1140 includes the rotating plate 1141, the first magnet 1142 having the coupling strength with the rotating plate 1141, and the second magnet 1143 positioned in the rotating plate 1141.

The rotating plate 1141 may be coupled to the mover 1130 and the first housing 1120. The rotating plate 1141 may include an additional magnet (not illustrated) positioned therein.

In addition, the rotating plate 1141 may be disposed adjacent to the optical axis. Therefore, the actuator according to the embodiment may easily change the optical path according to first-axis tilting and second-axis tilting to be described below.

The rotating plate 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. Detailed description thereof will be made below.

In addition, the first magnet 1142 includes a plurality of yokes, and the plurality of yokes may be positioned to face each other based on the rotating plate 1141. In the embodiment, the first magnet 1142 may include a plurality of facing yokes. In addition, the rotating plate 1141 may be positioned between the plurality of yokes.

As described above, the first magnet 1142 may be positioned in the first housing 1120. In addition, as described above, the first magnet 1142 may be seated on an inner surface or outer surface of the fourth housing side portion 1124. For example, the first magnet 1142 may be seated in a groove formed in the outer surface of the fourth housing side portion 1124. Alternatively, the first magnet 1142 may be seated in the first housing groove 1124*a*.

In addition, the second magnet 1143 may be positioned on the mover 1130, particularly, an outer surface of the holder 1131. With this configuration, the rotating plate 1141 may be easily coupled to the first housing 1120 and the mover 1130 by the coupling strength generated by a magnetic force between the second magnet 1143 and the first magnet 1142 disposed therein. In the present invention, the positions of the first magnet 1142 and the second magnet 1143 may be interchanged.

The first driving unit 1150 includes the first driving magnet 1151, the first driving coil 1152, the first Hall sensor unit 1153, and the first board unit 1154.

The first driving magnet 1151 may include a plurality of magnets. In the embodiment, the first driving magnet 1151 may include a first magnet 1151*a*, a second magnet 1151*b*, and a third magnet 1151*c*.

The first magnet 1151*a*, the second magnet 1151*b*, and the third magnet 1151*c* may each be positioned on the outer surface of the holder 1131. In addition, the first magnet 1151*a* and the second magnet 1151*b* may be positioned to face each other. In addition, the third magnet 1151*c* may be positioned on a lower surface of the outer surface of the holder 1131. Detailed description thereof will be made below.

The first driving magnet 1152 may include a plurality of coils. In the embodiment, the first driving coil 1152 may include a first coil 1152*a*, a second coil 1152*b*, and a third coil 1152*c*.

The first coil 1152*a* may be positioned to face the first magnet 1151*a*. Therefore, as described above, the first coil

1152*a* may be positioned in the first housing hole 1121*a* of the first housing side portion 1121.

In addition, the second coil 1152*b* may be positioned to face the second magnet 1151*b*. Therefore, as described above, the second coil 1152*b* may be positioned in the second housing hole 1122*a* of the second housing side portion 1122.

The first coil 1152*a* may be positioned to face the second coil 1152*b*. In other words, the first coil 1152*a* may be symmetrically disposed with the second coil 1152*b* with respect to the first direction (X-axis direction). This may also be applied to the first magnet 1151*a* and the second magnet 1151*b* in the same manner. In other words, the first magnet 1151*a* and the second magnet 1151*b* may be symmetrically disposed with respect to the first direction (X-axis direction). In addition, at least portions of the first coil 1152*a*, the second coil 1152*b*, the first magnet 1151*a*, and the second magnet 1151*b* may be disposed to overlap in the second direction (Y-axis direction). With this configuration, the X-axis tilting may be accurately performed without being biased to one side by the electromagnetic force between the first coil 1152*a* and the first magnet 1151*a* and the electromagnetic force between the second coil 1152*b* and the second magnet 1151*b*.

The third coil 1152*c* may be positioned to face the third magnet 1151*c*. Therefore, as described above, the third coil 1152*c* may be positioned in the third housing hole 1123*a* of the third housing side portion 1123. The third coil 1152*c* may generate an electromagnetic force with the third magnet 1151*c* so that the mover 1130 and the rotating unit 1140 may perform a Y-axis tilting based on the first housing 1120.

Here, an X-axis tilting is a tilting with respect to the X-axis, and a Y-axis tilting is a tilting with respect to the Y-axis.

The first Hall sensor unit 1153 may include a plurality of Hall sensors. The Hall sensor corresponds to and is used interchangeably with “sensor unit” to be described below. In the embodiment, the first Hall sensor unit 1153 may include a first Hall sensor 1153*a*, a second Hall sensor 1153*b*, and a third Hall sensor 1153*c*.

The first Hall sensor 1153*a* may be positioned inside the first coil 1152*a*. In addition, the second Hall sensor 1153*b* may be disposed symmetrically with the first Hall sensor 1153*a* in the first direction (X-axis direction) and the third direction (Z-axis direction). In addition, the second Hall sensor 1153*b* may be positioned inside the second coil 1152*b*.

The first Hall sensor 1153*a* may detect a change in a magnetic flux inside the first coil 1152*a*. In addition, the second Hall sensor 1153*b* may detect a change in a magnetic flux in the second coil 1152*b*. Therefore, it is possible to perform position sensing between the first and second magnets 1151*a* and 1151*b* and the first and second Hall sensors 1153*a* and 1153*b*. The first camera actuator according to the embodiment may more accurately control the X-axis tilting by detecting the position through, for example, the first and second Hall sensors 1153*a* and 1153*b*.

In addition, the third Hall sensor 1153*c* may be positioned inside the third coil 1152*c*. The third Hall sensor 1153*c* may detect a change in a magnetic flux inside the third coil 1152*c*. Therefore, it is possible to perform position sensing between the third magnet 1151*c* and the third Hall sensor 1153*c*. Therefore, the first camera actuator according to the embodiment may control the Y-axis tilting. At least one of the first to third Hall sensors may be provided.

The first board unit 1154 may be positioned under the first driving unit 1150. The first board unit 1154 may be electrically connected to the first driving coil 1152 and the first Hall sensor unit 1153. For example, the first board unit 1154 may be coupled to the first driving coil 1152 and the first Hall sensor unit 1153 by a surface mount technology (SMT). However, the present invention is not limited to this method.

The first board unit 1154 may be positioned between the first shield can (not illustrated) and the first housing 1120 and coupled to the first shield can and the first housing 1120. The coupling method may be variously performed as described above. In addition, through the coupling, the first driving coil 1152 and the first Hall sensor unit 1153 may be positioned in an outer surface of the first housing 1120.

The first board unit 1154 may include a circuit board having wiring patterns that may be electrically connected, such as a rigid printed circuit board (rigid PCB), a flexible PCB, and a rigid-flexible PCB. However, the present invention is not limited to these types.

Figure 5:
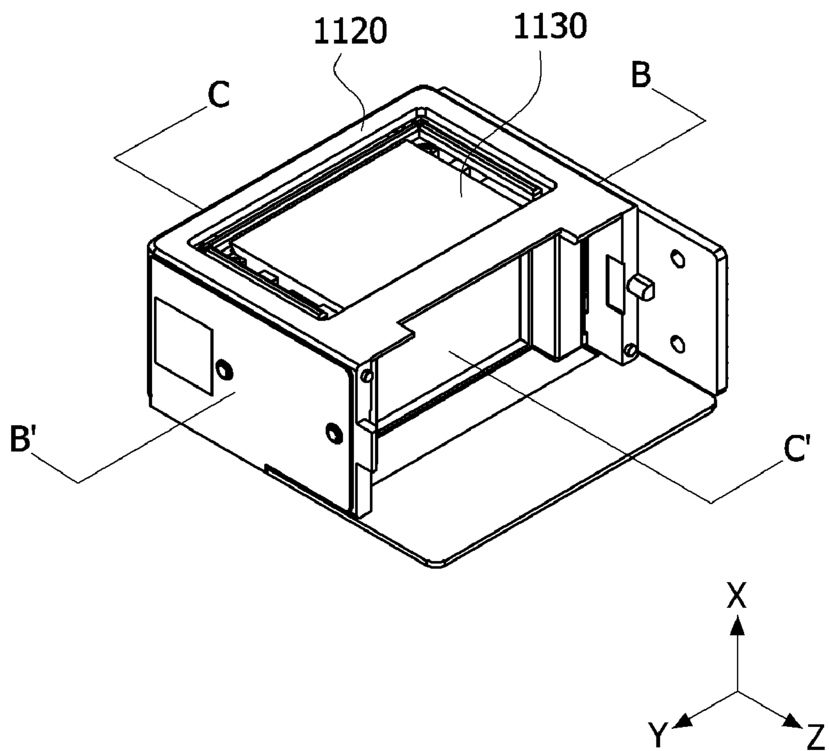
FIG. 5 is a perspective view of the first camera actuator according to the embodiment from which a first shield can and a board are removed.
Figure 6:
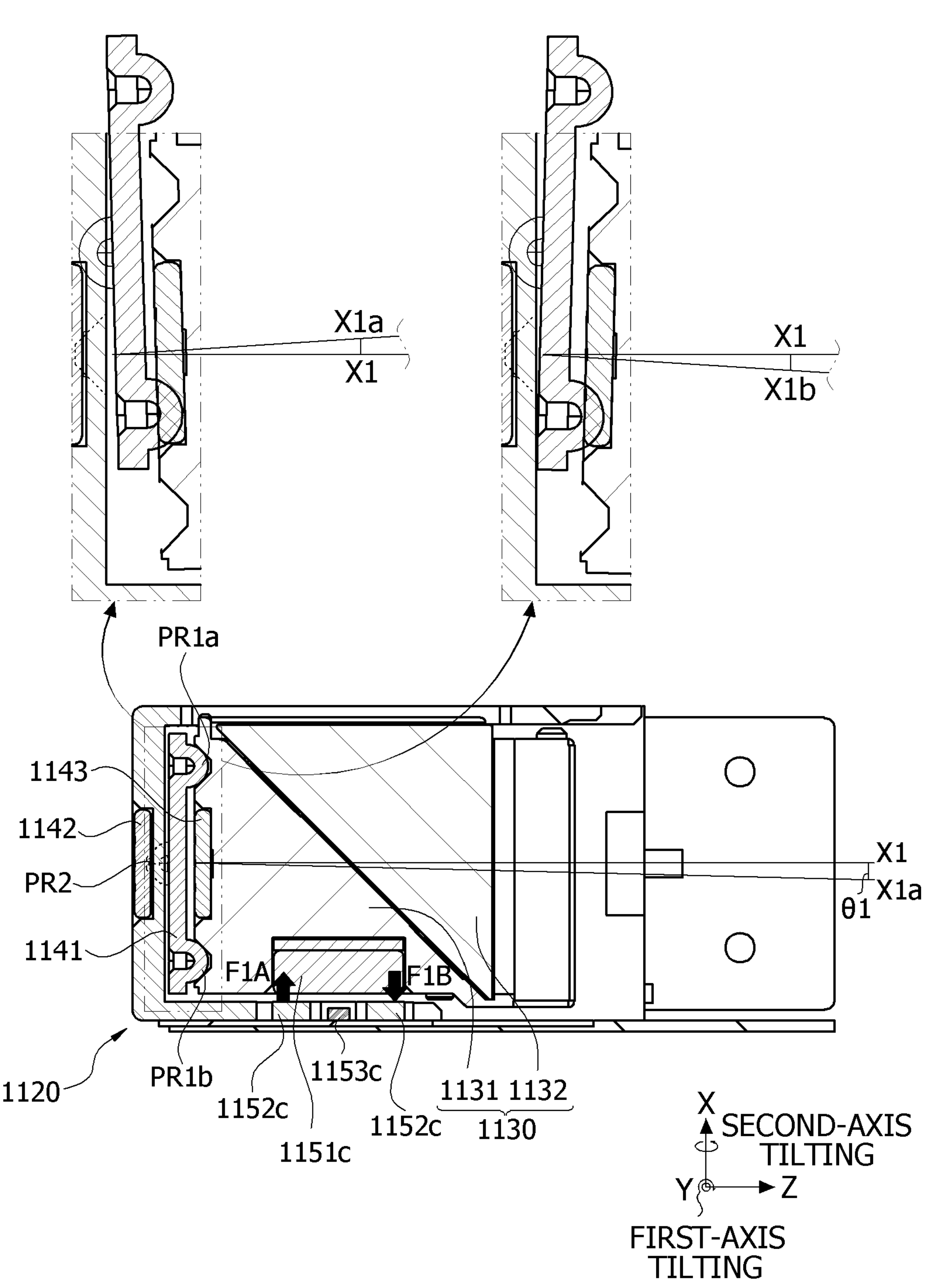
FIG. 6 is a cross-sectional view along line B-B' in FIG. 5.
Figure 7:
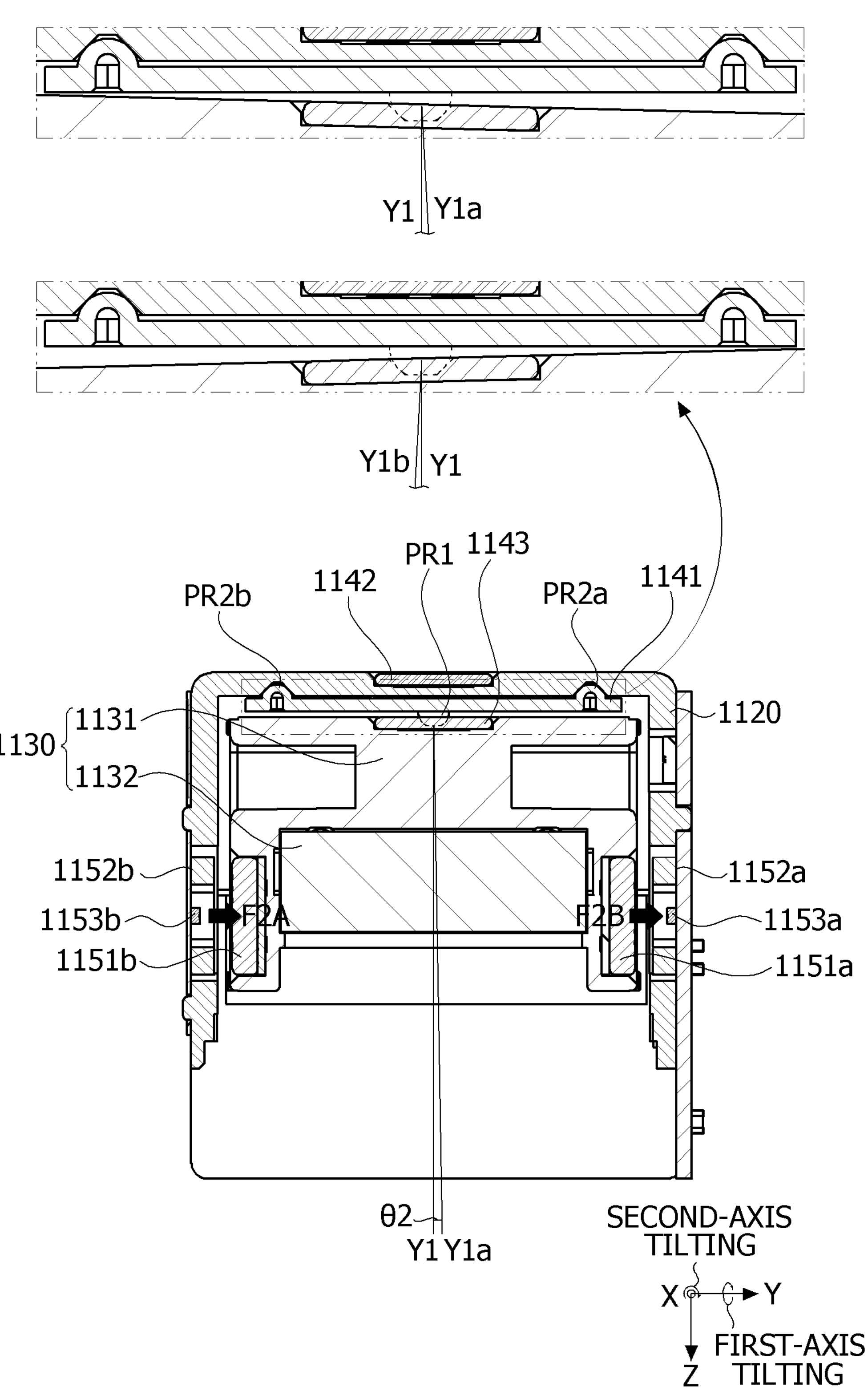
FIG. 7 is a cross-sectional view along line C-C' in FIG. 5.

FIG. 5 is a perspective view of the first camera actuator according to the embodiment from which a first shield can and a board are removed, FIG. 6 is a cross-sectional view along line B-B' in FIG. 5, and FIG. 7 is a cross-sectional view along line C-C' in FIG. 5.

Referring to FIGS. 5 to 7, the first coil 1152*a* may be positioned on the first housing side portion 1121.

In addition, the first coil 1152*a* and the first magnet 1151*a* may be positioned to face each other. At least a portion of the first magnet 1151*a* may overlap the first coil 1152*a* in the second direction (Y-axis direction).

In addition, the second coil 1152*b* may be positioned on the second housing side portion 1122. Therefore, the second coil 1152*b* and the second magnet 1151*b* may be positioned to face each other. At least a portion of the second magnet 1151*b* may overlap the second coil 1152*b* in the second direction (Y-axis direction).

In addition, the first coil 1152*a* and the second coil 1152*b* may overlap each other in the second direction (Y-axis direction). In addition, the first magnet 1151*a* and the second magnet 1151*b* may overlap each other in the second direction (Y-axis direction). With this configuration, the electromagnetic force applied to the outer surfaces of the holder (the first holder outer surface and the second holder outer surface) may be positioned on parallel axes in the second direction (Y-axis direction) so that the X-axis tilting may be performed accurately and precisely.

In addition, a first accommodating groove (not illustrated) may be positioned in the fourth holder outer surface. In addition, first protrusions PR1*a* and PR1*b* may be disposed in the first accommodating groove. Therefore, when the X-axis tilting is performed, the first protrusions PR1*a* and PR1*b* may be reference axes (or rotation axes) of the tilting. Therefore, the rotating plate 1141 and the mover 1130 may move to a left or right side.

As described above, the second protruding portion PR2 may be seated in a groove of an inner surface of the fourth housing side portion 1124. In addition, when the Y-axis tilting is performed, the rotating plate and the mover may be rotated using the second protruding portion PR2 as a reference axis of the Y-axis tilting.

According to the embodiment, an OIS may be performed by the first protruding portion and the second protruding portion.

Referring to FIG. 6, the Y-axis tilting may be performed. In other words, an OIS can be implemented by rotating the first camera actuator in the first direction (X-axis direction).

In the embodiment, the third magnet 1151*c* disposed under the holder 1131 may generate the electromagnetic force with the third coil 1152*c* to tilt or rotate the mover 1130 in the first direction (X-axis direction).

Specifically, the rotating plate 1141 may be coupled to the first housing 1120 and the mover 1130 by the first magnet 1142 in the first housing 1120 and the second magnet 1143 in the mover 1130. In addition, the first protruding portions PR1 may be spaced apart from each other in the first direction (X-axis direction) and supported by the first housing 1120.

In addition, the rotating plate 1141 may be rotated or tilted using the second protruding portion PR2 protruding toward the mover 1130 as a reference axis (or a rotation axis). In other words, the rotating plate 1141 may perform the Y-axis tilting using the second protruding portion PR2 as the reference axis.

For example, an OIS can be implemented by rotating (X1→X1*a* or X1*b*) the mover 130 at a first angle θ1 in the X-axis direction by first electromagnetic forces F1A and F1B between the third magnet 1151*c* disposed in the third seating groove and the third coil 1152*c* disposed on the third board side portion. The first angle θ1 may be in a range of ±1° to ±3°. However, the present invention is not limited thereto.

Hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

Referring to FIG. 7, the X-axis tilting may be performed. In other words, an OIS can be implemented by rotating the mover 1130 in the second direction (Y-axis direction).

The OIS can be implemented by tilting or rotating (or X-axis tilting) the mover 1130 in the Y-axis direction.

In the embodiment, the first magnet 1151*a* and the second magnet 1151*b* disposed in the holder 1131 may tilt or rotate the rotating plate 1141 and the mover 1130 in the second direction (Y-axis direction) by generating the electromagnetic force with the first coil 1152*a* and the second coil 1152*b*, respectively.

The rotating plate 1141 may be rotated or tilted (X-axis tilting) in the second direction using the first protruding portion PR1 as a reference axis (or a rotation axis).

For example, an OIS can be implemented by rotating (Y1→Y1*a*, Y1*b*) the mover 130 at a second angle θ2 in the Y-axis direction by second electromagnetic forces F2A and F2B between the first and second magnets 1151*a* and 1151*b* disposed in the first seating groove and the first and second coils 1152*a* and 1152*b* disposed on the first and second board side portions. The second angle θ2 may be in a range of ±1° to ±3°. However, the present invention is not limited thereto.

In addition, as described above, the electromagnetic forces generated by the first and second magnets 1151*a* and 1151*b* and the first and second coils 1152*a* and 1152*b* may act in the third direction or a direction opposite to the third direction. For example, the electromagnetic force may be generated on a left side portion of the mover 1130 in the third direction (Z-axis direction) and may act on a right side portion of the mover 1130 in a direction opposite to the third direction (Z-axis direction). Therefore, the mover 1130 may rotate with respect to the first direction. Alternatively, the mover 130 may be moved in the second direction.

As described above, the first camera actuator according to the embodiment may control the rotating plate 1141 and the mover 1130 to be rotated in the first direction (X-axis direction) or second direction (Y-axis direction) by the electromagnetic force between the first driving magnet in the holder and the first driving coil disposed in the housing, thereby minimizing the occurrence of a decentering or tilting phenomenon and providing the best optical characteristics upon implementing the OIS. In addition, as described above, "Y-axis tilting" may correspond to rotating or tilting in the first direction (X-axis direction). In addition, "X-axis tilting" may correspond to rotating or tilting in the second direction (Y-axis direction).

Figure 8:
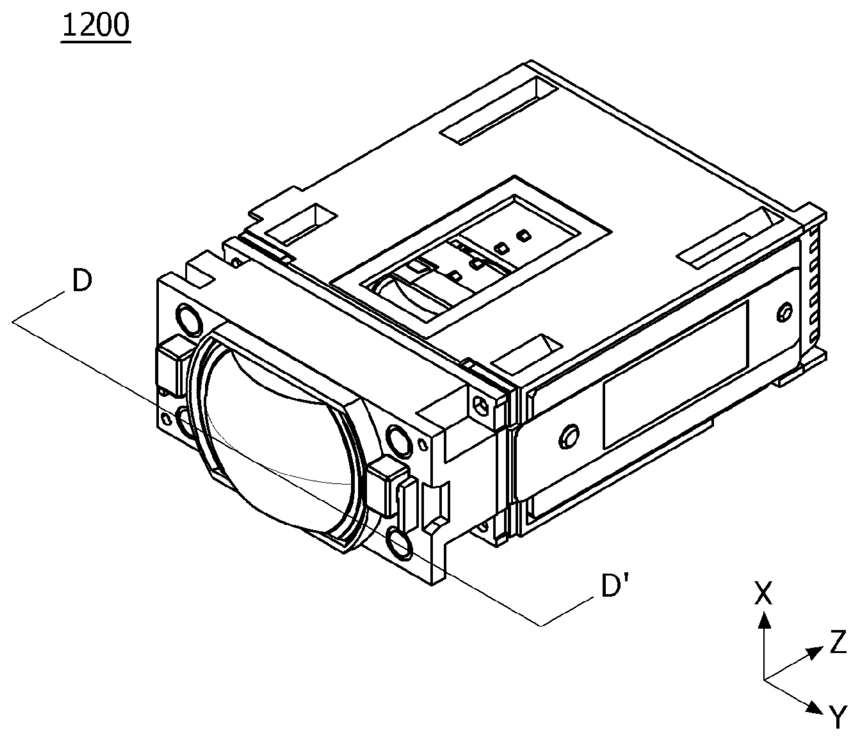
FIG. 8 is a perspective view of a second camera actuator according to the embodiment.
Figure 9:
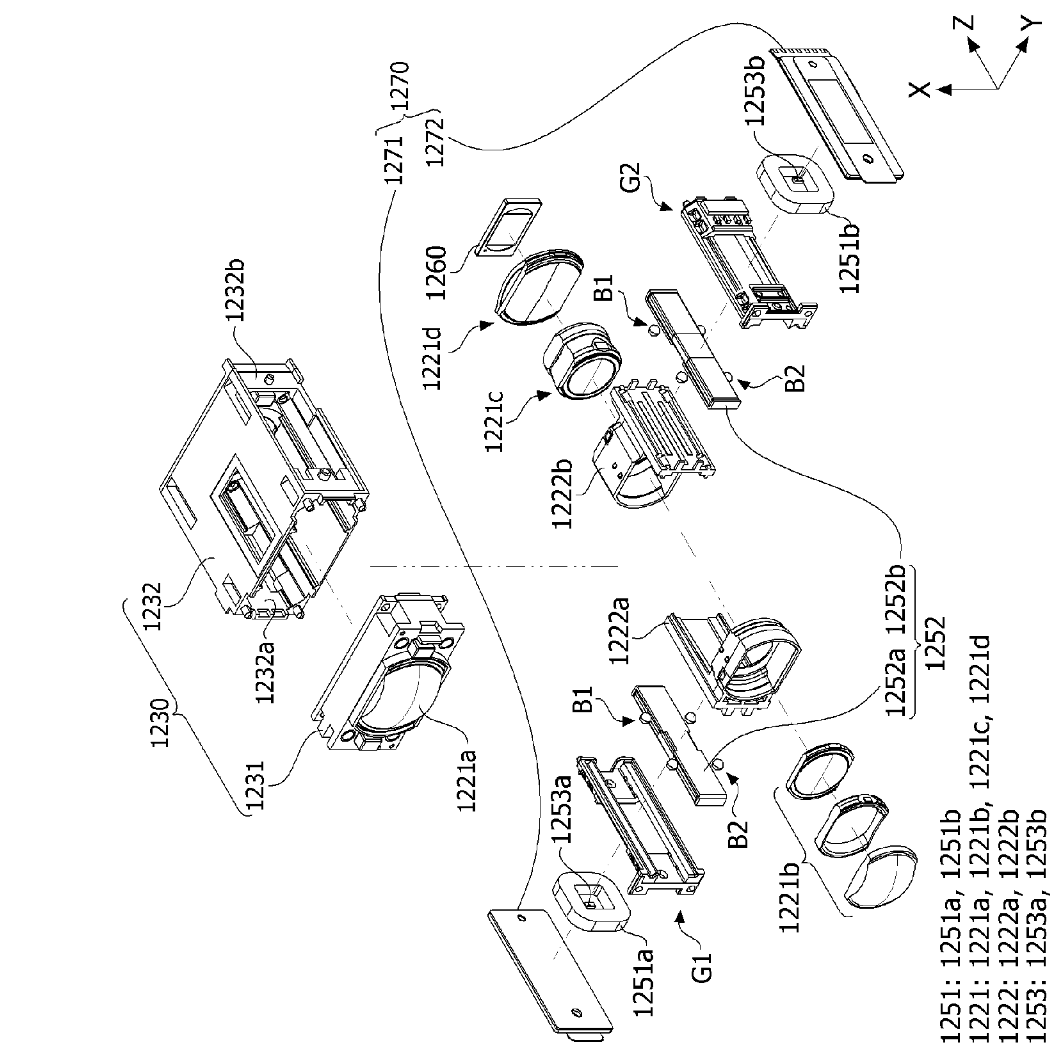
FIG. 9 is an exploded perspective view of the second camera actuator according to the embodiment.
Figure 10:
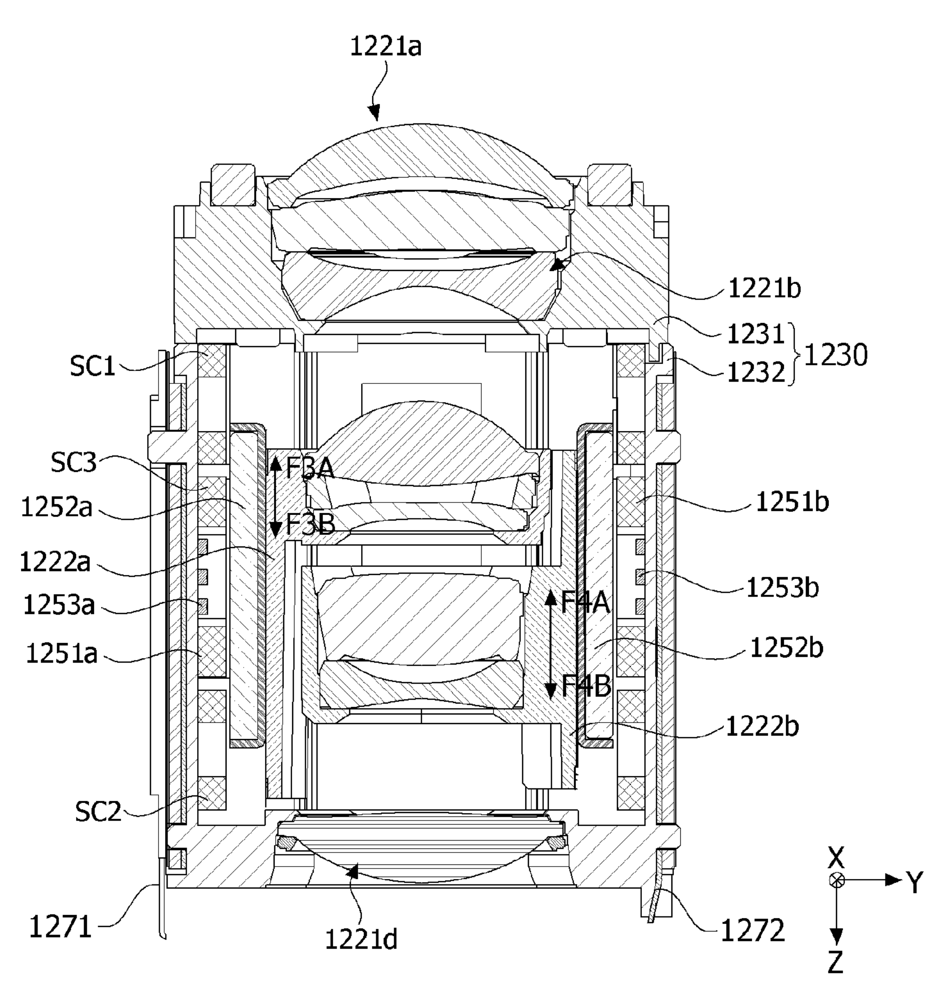
FIG. 10 is a cross-sectional view along line D-D' in FIG. 8.

FIG. 8 is a perspective view of a second camera actuator according to an embodiment, FIG. 9 is an exploded perspective view of the second camera actuator according to the embodiment, and FIG. 10 is a cross-sectional view along line D-D' in FIG. 8.

Referring to FIGS. 8 to 10, the second camera actuator 1200 according to the embodiment may include a lens unit 1220, a second housing 1230, a second driving unit 1250, a base unit 1260, a second board unit 1270, and a bonding member 1280. Furthermore, the second camera actuator 1200 may further include a second shield can (not illustrated), an elastic unit (not illustrated), and a bonding member (not illustrated).

The second shield can (not illustrated) may be positioned in one area (e.g., an outermost side) of the second camera actuator 1200 and positioned to surround the components (the lens unit 1220, the second housing 1230, the second driving unit 1250, the base unit 1260, the second board unit 1270, and an image sensor IS) to be describe below.

The second shield can (not illustrated) can block or reduce electromagnetic waves generated from the outside. Therefore, it is possible to reduce the occurrence of malfunction in the second driving unit 1250.

The lens unit 1220 may be positioned in the second shield can (not illustrated). The lens unit 1220 may move in the third direction (Z-axis direction or optical axis direction). Therefore, the above-described AF function or zooming function can be performed.

In addition, the lens unit 1220 may be positioned in the second housing 1230. Therefore, at least a portion of the lens unit 1220 may move in the second housing 1230 in the optical axis direction or third direction (Z-axis direction).

Specifically, the lens unit 1220 may include a lens group 1221 and a moving assembly 1222.

First, the lens group 1221 may include at least one lens. In addition, although a plurality of lens groups 1221 may be provided, the following description will be made based on one lens group.

The lens group 1221 may be coupled to the moving assembly 1222 and moved by an electromagnetic force generated from a fourth magnet 1252*a* and a fifth magnet 1252*b* coupled to the moving assembly 1222 in the third direction (Z-axis direction).

In the embodiment, the lens group 1221 may include a first lens group 1221*a*, a second lens group 1221*b*, and a third lens group 1221*c*. The first lens group 1221*a*, the second lens group 1221*b*, and the third lens group 1221*c* may be sequentially disposed in the optical axis direction. Furthermore, the lens group 1221 may further include a fourth lens group 1221*d*. The fourth lens group 1221*d* may be disposed at a rear end of the third lens group 1221*c*.

The first lens group 1221*a* may be fixedly coupled to a 2-1 housing. In other words, the first lens group 1221*a* may not move in the optical axis direction.

The second lens group 1221*b* may be coupled to a first lens assembly 1222*a* to move in the third direction or optical axis direction. Magnification adjustment may be performed by moving the first lens assembly 1222_a_ and the second lens group 1221_b_.

The third lens group 1221_c_ may be coupled to the second lens assembly 1222_b_ to move in the third direction or optical axis direction. Focus adjustment or auto focusing may be performed by moving the third lens group 1221.

However, the present invention is not limited to the number of lens groups, and the fourth lens group 1221_d_ may not be present, or additional lens groups or the like other than the fourth lens group 1121_d_ may be further disposed.

The moving assembly 1222 may include an opening area surrounding the lens group 1221. The moving assembly 1222 is used interchangeably with the lens assembly. In addition, the moving assembly 1222 may be coupled to the lens group 1221 by various methods. In addition, the moving assembly 1222 may include a groove in a side surface thereof and may be coupled to the fourth magnet 1252_a_ and the fifth magnet 1252_b_ through the groove. A coupling member or the like may be applied to the groove.

In addition, the moving assembly 1222 may be coupled to the elastic units (not illustrated) at an upper end and a rear end thereof. Therefore, the moving assembly 1222 may be supported by the elastic units (not illustrated) while moving in the third direction (Z-axis direction). In other words, the position of the moving assembly 1222 may be maintained in the third direction (Z-axis direction). The elastic unit (not illustrated) may be formed of various elastic elements such as a leaf spring.

The moving assembly 1222 may be positioned in the second housing 1230 and may include the first lens assembly 1222_a_ and a second lens assembly 1222_b_.

An area of the second lens assembly 1222_b_ in which the third lens group is seated may be positioned at a rear end of the first lens assembly 1222_a_. In other words, the area of the second lens assembly 1222_b_ in which the third lens group 1221_c_ is seated may be positioned between an area of the first lens assembly 1222_a_ in which the second lens group 1221_b_ is seated and the image sensor.

The first lens assembly 1222_a_ and the second lens assembly 1222_b_ may face a first guide unit G1 and a second guide unit G2, respectively. The first guide unit G1 and the second guide unit G2 may be positioned on a first side portion and a second side portion of the second housing 1230 to be described below. Detailed description thereof will be made below.

In addition, a second driving magnet may be seated on outer surfaces of the first lens assembly 1222_a_ and the second lens assembly 1222_b_. For example, the fifth magnet 1252_b_ may be seated on the outer surface of the second lens assembly 1222_b_. The fourth magnet 1252_a_ may be seated on the outer surface of the first lens assembly 1222_a_.

The second housing 1230 may be disposed between the lens unit 1220 and the second shield can (not illustrated). In addition, the second housing 1230 may be disposed to surround the lens unit 1220.

The second housing 1230 may include a 2-1 housing 1231 and a 2-2 housing 1232. The 2-1 housing 1231 may be coupled to the first lens group 1221_a_ and may also be coupled to the above-described first camera actuator. The 2-1 housing 1231 may be positioned in front of the 2-2 housing 1232.

In addition, the 2-2 housing 1232 may be positioned at a rear end of the 2-1 housing 1231. The lens unit 1220 may be seated inside the 2-2 housing 1232.

A hole may be formed in a side portion of the second housing 1230 (or the 2-2 housing 1232). A fourth coil 1251_a_ and a fifth coil 1251_b_ may be disposed in the hole. The hole may be positioned to correspond to the above-described groove of the moving assembly 1222.

In the embodiment, the second housing 1230 (in particular, the 2-2 housing 1232) may include a first side portion 1232_a_ and a second side portion 1232_b_. The first side portion 1232_a_ and the second side portion 1232_b_ may be positioned to correspond to each other. For example, the first side portion 1232_a_ and the second side portion 1232_b_ may be symmetrically disposed with respect to the third direction. A second driving coil 1251 may be positioned on the first side portion 1232_a_ and the second side portion 1232_b_. In addition, the second board unit 1270 may be seated on outer surfaces of the first side portion 1232_a_ and the second side portion 1232_b_. In other words, a second board 1271 may be positioned on the outer surface of the first side portion 1232_a_, and a third board 1272 may be positioned on the outer surface of the second side portion 1232_b_.

Furthermore, the first guide unit G1 and the second guide unit G2 may be positioned on the first side portion 1232_a_ and the second side portion 1232_b_ of the second housing 1232 (in particular, the 2-2 housing 1232).

The first guide unit G1 and the second guide unit G2 may be positioned to correspond to each other. For example, the first guide unit G1 and the second guide unit G2 may be positioned to face each other with respect to the third direction (Z-axis direction). In addition, at least portions of the first guide unit G1 and the second guide unit G2 may overlap each other in the second direction (Y-axis direction).

The first guide unit G1 and the second guide unit G2 may include at least one groove (e.g., a guide groove) or recess. In addition, a first ball B1 or a second ball B2 may be seated in the groove or recess. Therefore, the first ball B1 or second ball B2 may move in the guide groove of the first guide unit G1 or guide groove of the second guide unit G2 in the third direction (Z-axis direction).

Alternatively, the first ball B1 or second ball B2 may move in the third direction along a rail formed at an inner side of the first side portion 1232_a_ of the second housing 1230 or a rail formed at an inner side of the second side portion 1232_b_ of the second housing 1230.

Therefore, the first lens assembly 1222_a_ and the second lens assembly 1222_b_ may move in the third direction.

According to the embodiment, the first ball B1 may be disposed on an upper portion of the first lens assembly 1222_a_ or second lens assembly 1222_b_. In addition, the second ball B2 may be disposed on a lower portion of the first lens assembly 1222_a_ or second lens assembly 1222_b_. For example, the first ball B1 may be positioned above the second ball B2. Therefore, at least a portion of the first ball B1 may overlap the second ball B2 in the first direction (X-axis direction) depending on a position.

In addition, the first guide unit G1 and the second guide unit G2 may include first guide grooves GG1_a_ and GG2_a_ facing a first recess RS1. In addition, the first guide unit G1 and the second guide unit G2 may include second guide grooves GG1_b_ and GG2_b_ facing a second recess RS2. The first guide grooves GG1_a_ and GG2_a_ and the second guide grooves GG1_b_ and GG2_b_ may be grooves extending in the third direction (Z-axis direction). In addition, the first guide grooves GG1_a_ and GG2_a_ and the second guide grooves GG1_b_ and GG2_b_ may have different shapes. For example, the first guide grooves GG1_a_ and GG2_a_ may be grooves having inclined side surfaces, and the second guide grooves GG1_b_ and GG2_b_ may be grooves having side surfaces perpendicular to lower surfaces thereof.

The fifth magnet 1252*b* may be positioned to face the fifth coil 1251*b*. In addition, the fourth magnet 1252*a* may be positioned to face the fourth coil 1251*a*.

The elastic unit (not illustrated) may include a first elastic member (not illustrated) and a second elastic member (not illustrated). The first elastic member (not illustrated) may be coupled to an upper surface of the moving assembly 1222. The second elastic member (not illustrated) may be coupled to a lower surface of the moving assembly 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the moving assembly 1222. However, the present invention is not limited to the above-described position, and the elastic unit may be disposed at any of various positions.

In addition, the second driving unit 1250 may provide a driving force for moving the lens unit 1220 in the third direction (Z-axis direction). The second driving unit 1250 may include the second driving coil 1251 and the second driving magnet 1252. Furthermore, the second driving unit 1250 may further include a second Hall sensor unit. The second Hall sensor unit 1253 may include at least one fourth Hall sensor 1253*a* and may be positioned inside or outside the second driving coil 1251.

The moving assembly may be moved in the third direction (Z-axis direction) by the electromagnetic force generated between the second driving coil 1251 and the second driving magnet 1252.

The second driving coil 1251 may include the fourth coil 1251*a* and the fifth coil 1251*b*. The fourth coil 1251*a* and the fifth coil 1251*b* may be disposed in the holes formed in the side portions of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

In addition, the second driving coil 1251 may be coupled to the second board unit 1270 through a yoke or the like. Furthermore, in an embodiment, the second driving coil 1251 is a fixed element together with the second board unit 1270. In contrast, the second driving magnet 1252 is a moving element that moves in the optical axis direction (Z-axis direction) together with the first and second assemblies.

The second driving magnet 1252 may include the fourth magnet 1252*a* and the fifth magnet 1252*b*. The fourth magnet 1252*a* and the fifth magnet 1252*b* may be disposed in the above-described groove of the moving assembly 1222 and positioned to correspond to the fourth coil 1251*a* and the fifth coil 1251*b*. In addition, the second driving magnet 1252 may be coupled to the first and second lens assemblies (or the moving assembly) together with the yoke to be described below.

The base unit 1260 may be positioned between the lens unit 1220 and the image sensor IS. A component such as a filter may be fixed to the base unit 1260. In addition, the base unit 1260 may be disposed to surround the above-described image sensor. With this configuration, since the image sensor is free from foreign substances and the like, it is possible to improve the reliability of the device. However, the following description will be made without this in some drawings.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

In addition, the second camera actuator may be a fixed zoom or a continuous zoom. For example, the second camera actuator may provide a movement of the lens group 1221.

In addition, the second camera actuator may be formed of a plurality of lens assemblies. For example, in addition to the first lens assembly 1222*a* and the second lens assembly 1222*b*, at least one of a third lens assembly (not illustrated) and the guide pin (not illustrated) may be disposed in the second camera actuator. The above-described contents may be applied thereto. Therefore, the second camera actuator may perform a high-magnification zooming function through the second driving unit. For example, the first lens assembly 1222*a* and the second lens assembly 1222*b* may be moving lenses that move through the second driving unit and the guide pin (not illustrated), and the third lens assembly (not illustrated) may be a fixed lens, but the present invention is not limited thereto. For example, the third lens assembly (not illustrated) may perform a function of a focator by which light forms an image at a specific position, and the first lens assembly may perform a function of a variator for re-forming an image formed by the third lens assembly (not illustrated), which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the second lens assembly 1222*b* which is the variator. However, the configuration of the embodiment will be described with reference to the following drawings.

The image sensor may be positioned at the inner side or outer side of the second camera actuator. In an embodiment, as illustrated, the image sensor may be positioned at the outer side of the second camera actuator. For example, the image sensor may be positioned on a circuit board. The image sensor may receive light and convert the received light into an electrical signal. In addition, the image sensor may include a plurality of pixels in the form of an array. In addition, the image sensor may be positioned on the optical axis.

The second board unit 1270 may be in contact with the second housing side portion. For example, the second board unit 1270 may be positioned on an outer surface (first side surface) of the first side portion and an outer surface (second side surface) of the second side portion of the second housing, in particular, the 2-2 housing and may be in contact with the first side surface and the second side surface.

In addition, in the camera device according to the embodiment, the second driving unit may provide driving forces F3A, F3B, F4A, and F4B that move the first lens assembly 1222*a* and the second lens assembly 1222*b* of the lens unit 1220 in the third direction (Z-axis direction). As described above, the second driving unit may include the second driving coil 1251 and the second driving magnet 1252. In addition, the lens unit 1220 may be moved by the electromagnetic force generated between the second driving coil 1251 and the second driving magnet 1252 in the third direction (Z-axis direction).

At this time, the fourth coil 1251*a* and the fifth coil 1251*b* may be disposed in the holes formed in the side portions (e.g., the first side portion and the second side portion) of the second housing 1230. In addition, the fifth coil 1251*b* may be electrically connected to the second board 1271. The fourth coil 1251*a* may be electrically connected to the third board 1272. Therefore, the fourth coil 1251*a* and the fifth coil 1251*b* may receive a driving signal (e.g., a current) from a driving driver on the circuit board 1300 through the second board unit 1270.

At this time, the first lens assembly 1222*a* on which the fourth magnet 1252*a* is seated may be moved in the third direction (Z-axis direction) by the electromagnetic forces F3A and F3B between the fourth coil 1251*a* and the fourth magnet 1252*a*. In addition, the second lens group 1221*b* seated on the first lens assembly 1222*a* may also move in the third direction.

In addition, the second lens assembly 1222*b* on which the fifth magnet 1252*b* is seated may be moved in the third direction (Z-axis direction) by the electromagnetic forces F4A and F4B between the fifth coil 1251*b* and the fifth magnet 1252*b*. In addition, the third lens group 1221*c* seated on the second lens assembly 1222*b* may also move in the third direction.

Therefore, as described above, a focal length or magnification of the optical system may be changed by moving the second lens group 1221*b* and the third lens group 1221*c*. In the embodiment, the magnification may be changed by moving the second lens group 1221*b*. In other words, zooming may be performed. In addition, a focus may be adjusted by moving the third lens group 1221*c*. In other words, auto focusing may be performed. With this configuration, the second camera actuator may be a fixed zoom or a continuous zoom.

Figure 11:
FIG. 11 is a schematic view illustrating a circuit board according to the embodiment.
Figure 11:
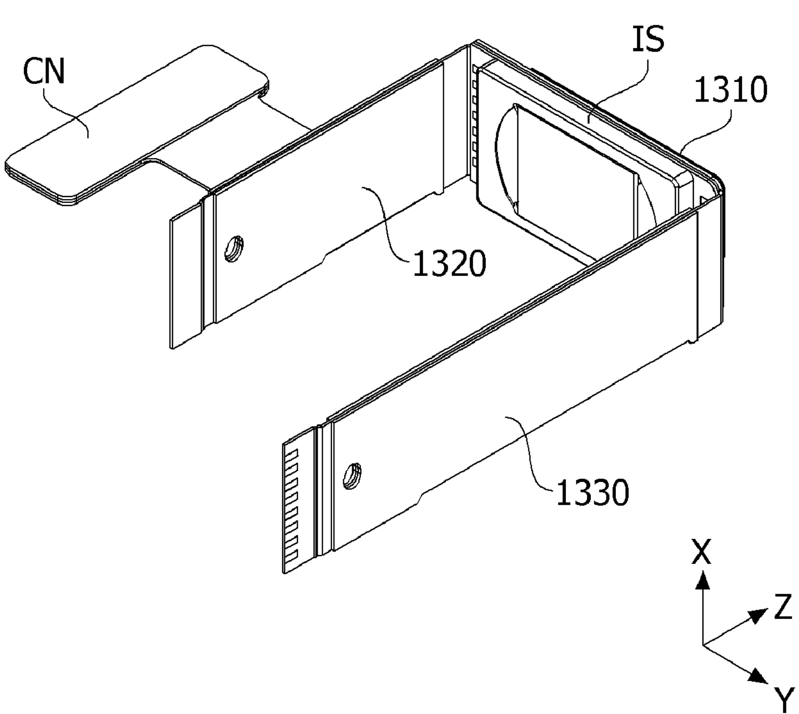

FIG. 11 is a schematic view illustrating a circuit board according to the embodiment.

Referring to FIG. 11, as described above, the circuit board 1300 according to the embodiment is referred to as "main board unit," and will be described below based on this term.

The main board unit 1300 may include a first unit main board 1310 and second and third unit main boards 1320 and 1330. The first unit main board 1310 may be positioned under the base and coupled to the base. In addition, the image sensor IS may be disposed on the first unit main board 1310. In addition, the first unit main board 1310 and the image sensor IS may be electrically connected.

In addition, the second and third unit main boards 1320 and 1330 may be positioned on the side portions of the base. In particular, the second and third unit main boards 1320 and 1330 may be positioned on the first side portion of the base. Therefore, the second and third unit main boards 1320 and 1330 may be positioned adjacent to the fourth coil positioned adjacent to the first side portion to facilitate electrical connection.

Furthermore, the circuit board 1300 may further include a fixed board (not illustrated) positioned on a side surface thereof. Therefore, even when the circuit board 1300 is made of a flexible material, the circuit board 1300 may be coupled to the base while maintaining stiffness by the fixed board.

The second and third unit main boards 1320 and 1330 of the circuit board 1300 may be positioned on the side portions of the second driving unit 1250. The circuit board 1300 may be electrically connected to the first driving unit and the second driving unit. For example, the electrical connection may be made by the SMT. However, the present invention is not limited to this method.

The circuit board 1300 may include a circuit board having wiring patterns that may be electrically connected, such as a rigid PCB, a flexible PCB, and a rigid flexible PCB. However, the present invention is not limited to these types. A detailed description thereof will be made below.

In addition, a connector unit CN may be connected to the second and third unit main boards 1320 and 1330. The camera device or circuit board may be electrically connected to an external electronic device through the connector unit CN. For example, the connector unit CN may be electrically connected to a processor of an electronic device such as a terminal.

In addition, the circuit board 1300 may be electrically connected to another camera module in the terminal or a processor of the terminal. Therefore, the above-described camera actuator and camera device including the same may transmit and receive various signals in the terminal.

Figure 12:
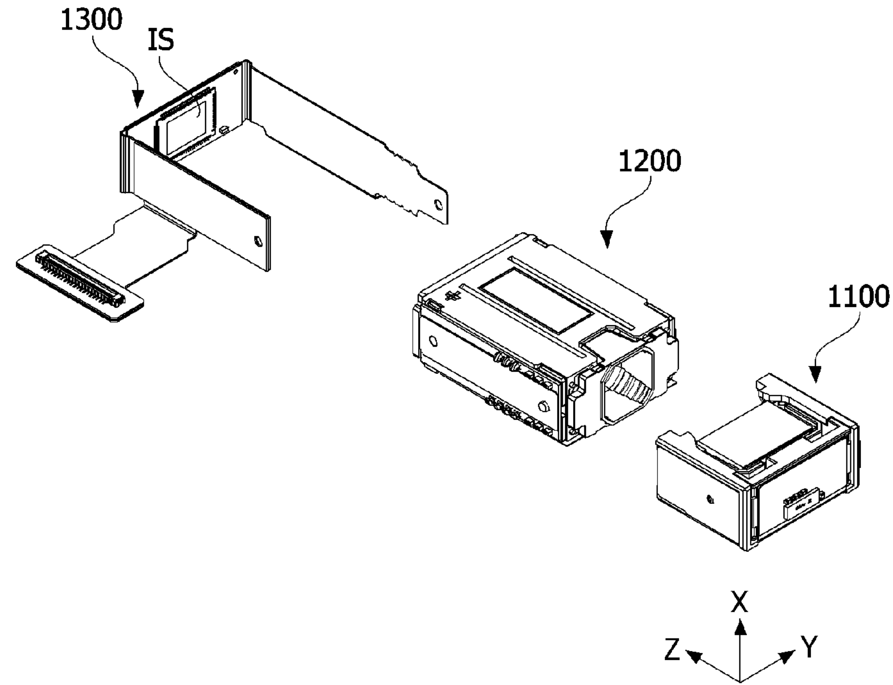
FIG. 12 is a perspective view of the separated first camera actuator and second camera actuator.

FIG. 12 is a perspective view of the separated first camera actuator and second camera actuator.

Referring to FIG. 12, the second camera actuator 1200 may be positioned at an rear end of the first camera actuator 1100.

Therefore, the first camera actuator 1100 and the second camera actuator 1200 may have facing surfaces. For example, a first surface of the first camera actuator 1100 and a second surface of the second camera actuator 1200 will be described as facing each other. In addition, the first surface may correspond to an outer surface of the above-described fifth housing side portion and may be a rear surface of the first camera actuator 1100, and the second surface may be a front surface of the second camera actuator 1200. A bonding member or the like may be applied to the first surface and the second surface. In addition, the first surface and the second surface may be coupled through the protrusion and groove structures. Therefore, the first camera actuator 1100 and the second camera actuator 1200 may be coupled.

Figure 13A:
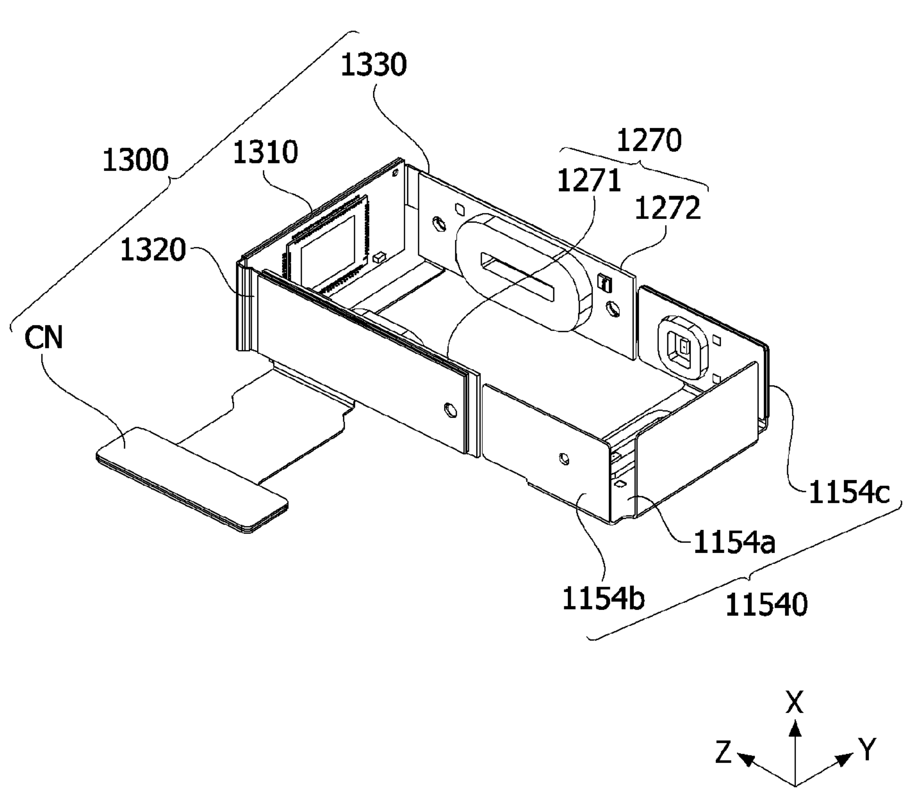
FIG. 13A is a perspective view of a circuit board, a first driving unit (not including some components), and a second driving unit (not including some components) according to the embodiment.
Figure 13B:
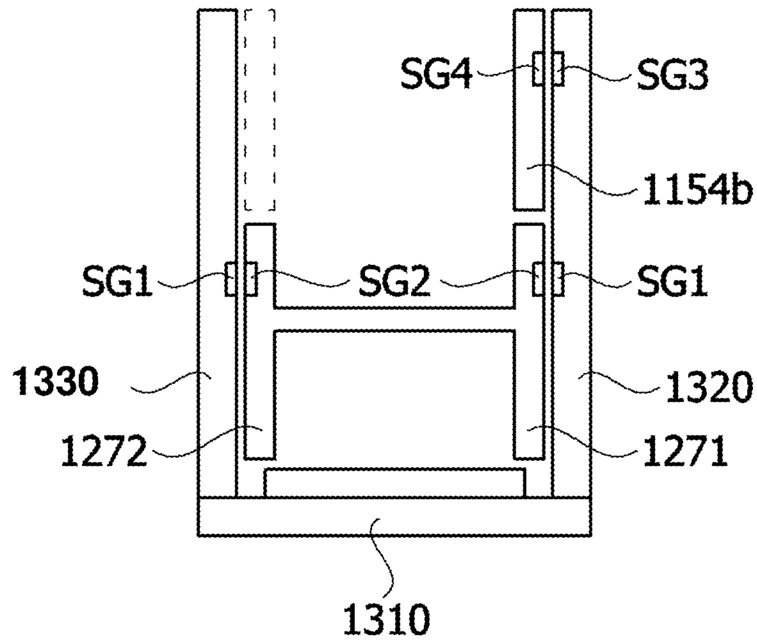
FIG. 13B is a conceptual diagram for describing the connection of the circuit board, the first driving unit (not including some components), and the second driving unit (not including some components) according to the embodiment.
Figure 13C:
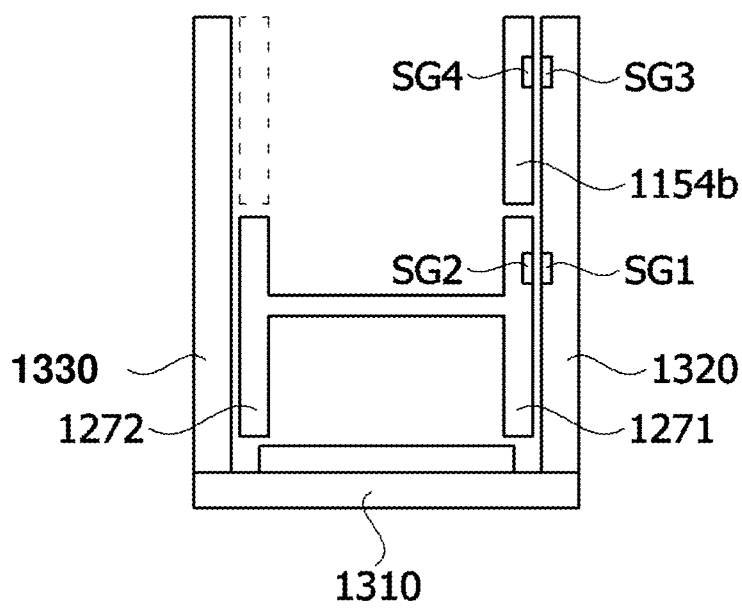
FIG. 13C is a conceptual diagram for describing the connection of a circuit board, a first driving unit (not including some components), and a second driving unit (not including some components) according to a modified example.
Figure 13D:
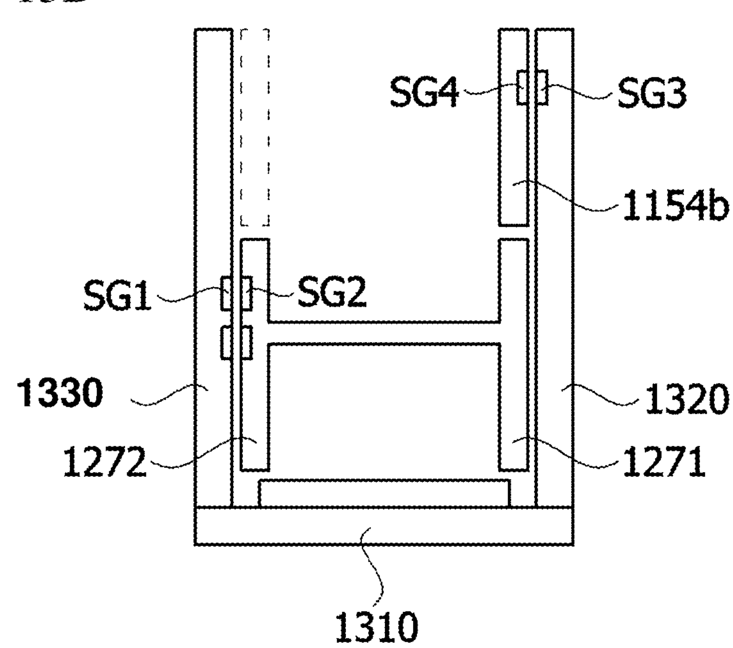
FIG. 13D is a conceptual diagram for describing the connection of a circuit board, a first driving unit (not including some components), and a second driving unit (not including some components) according to another embodiment.
Figure 13E:
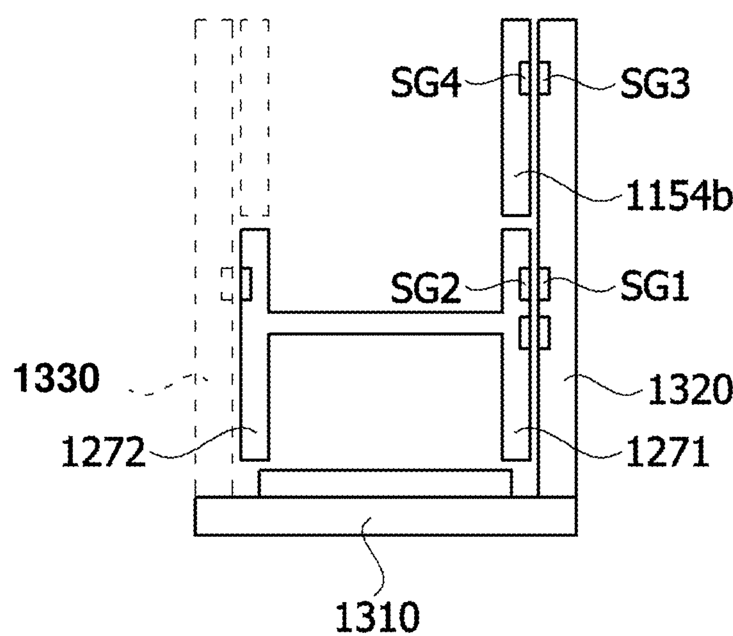
FIG. 13E is a conceptual diagram for describing the connection of a circuit board, a first driving unit (not including some components), and a second driving unit (not including some components) according to still another embodiment.
Figure 14:
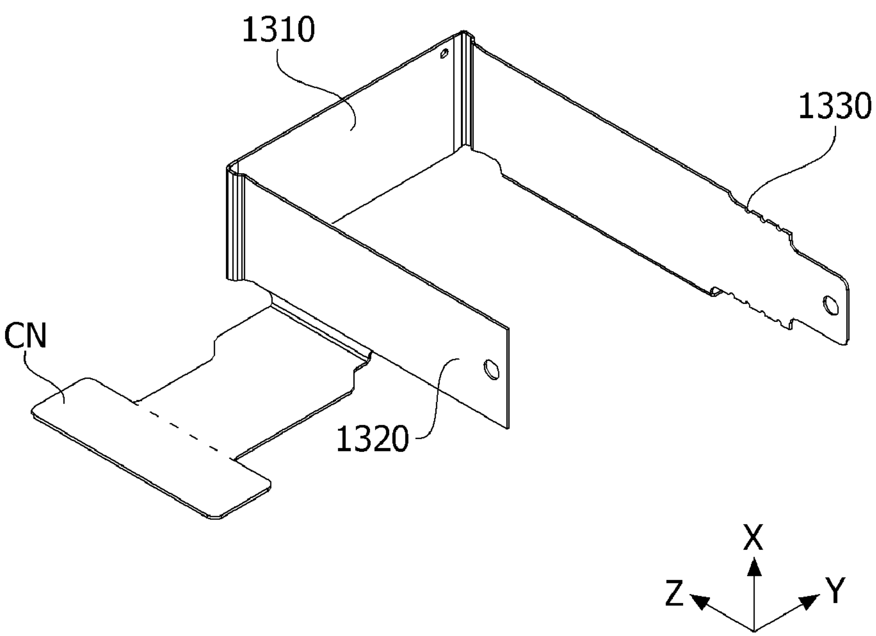
FIG. 14 is a perspective view of the circuit board according to the embodiment.
Figure 15:
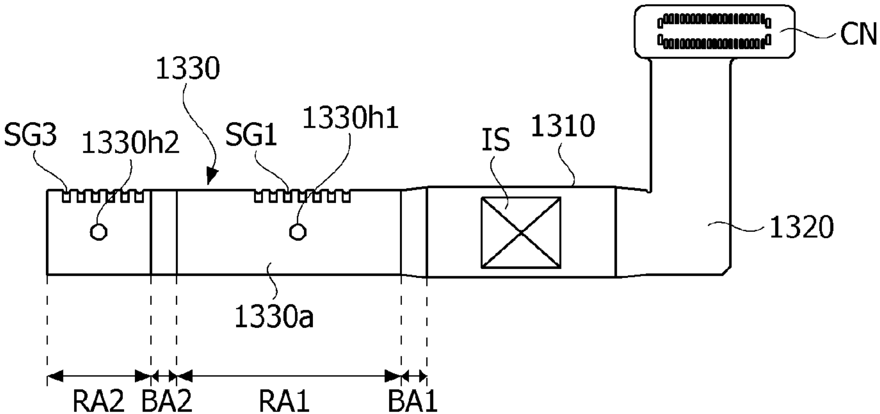
FIG. 15 is an inner plan view of the unfolded circuit board according to the embodiment.
Figure 16:
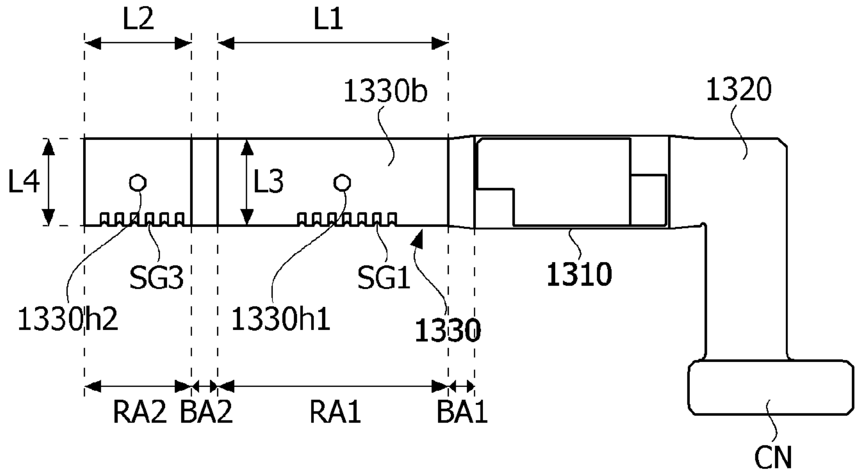
FIG. 16 is an outer plan view of the unfolded circuit board according to the embodiment.
Figure 17:
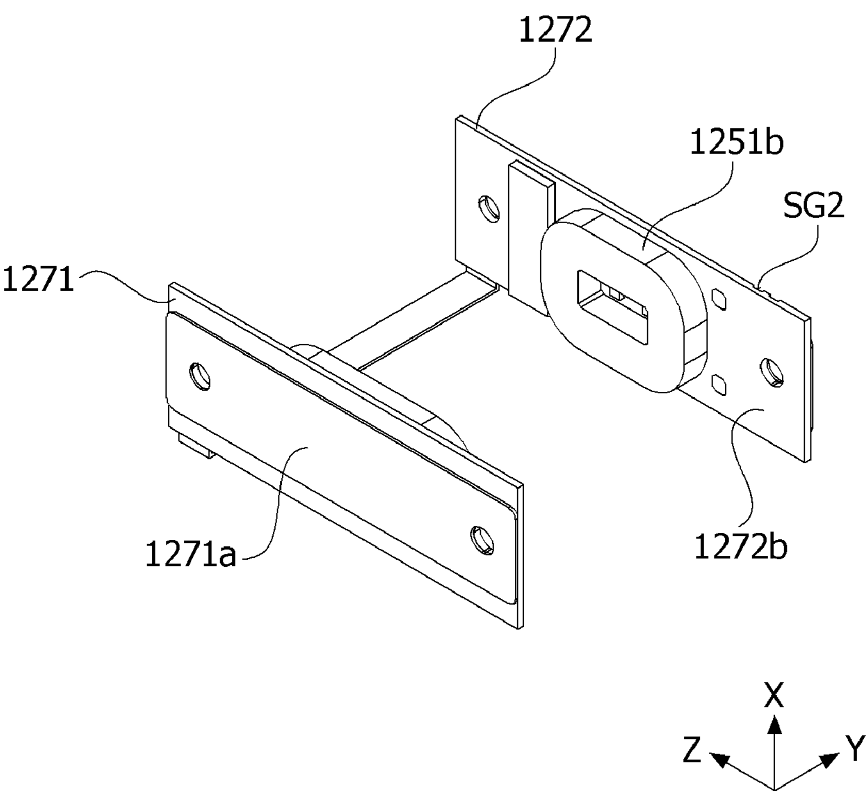
FIG. 17 is a perspective view from one side of the second driving unit (not including some components) according to the embodiment.
Figure 18:
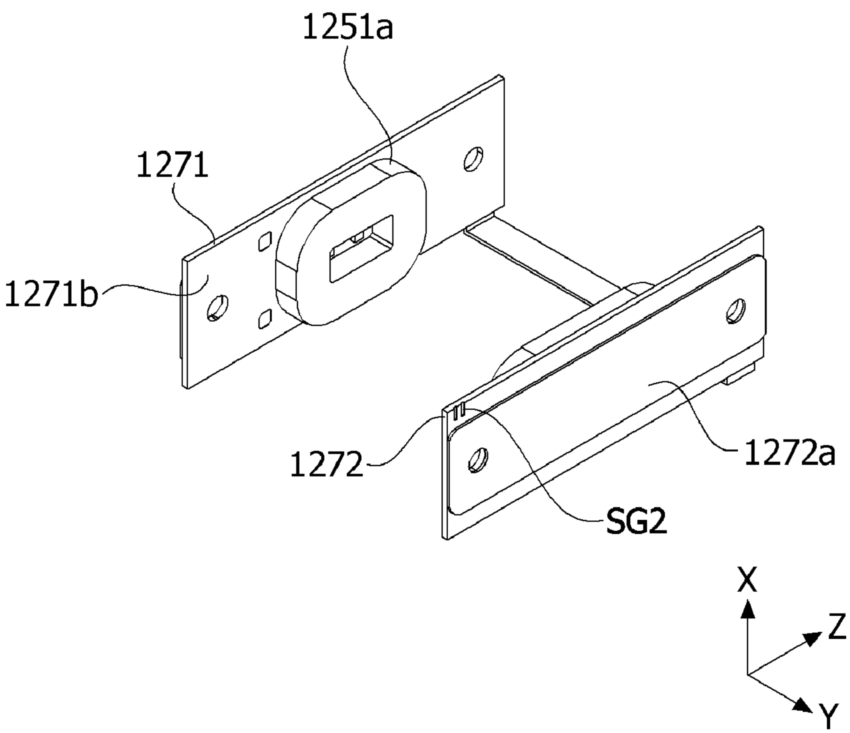
FIG. 18 is a perspective view from the other side of the second driving unit (not including some components) according to the embodiment.
Figure 19:
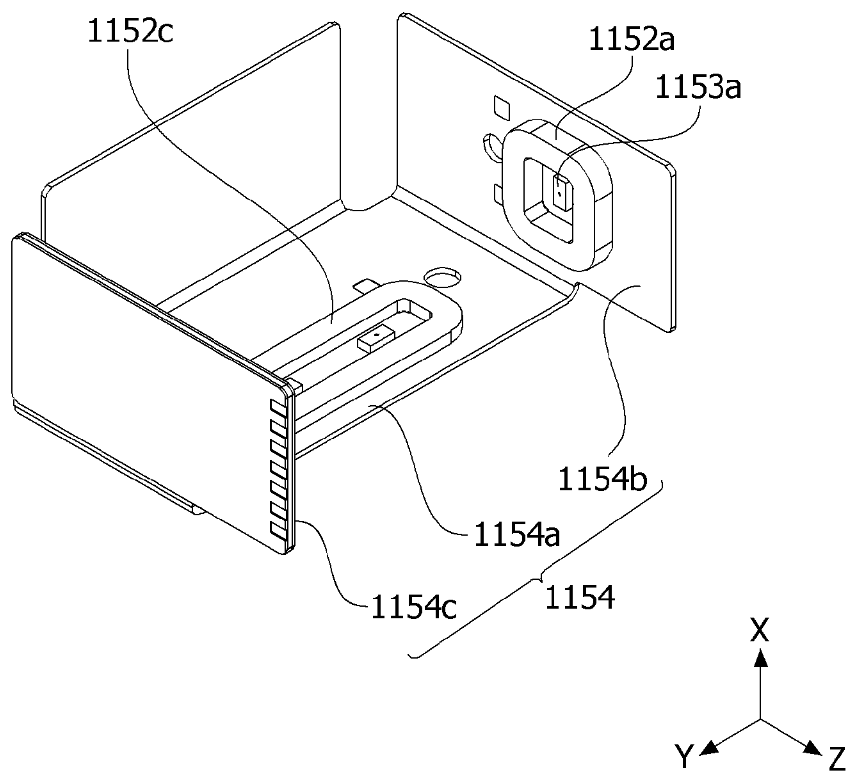
FIG. 19 is a perspective view from one side of the first driving unit (not including some components) according to the embodiment.
Figure 20:
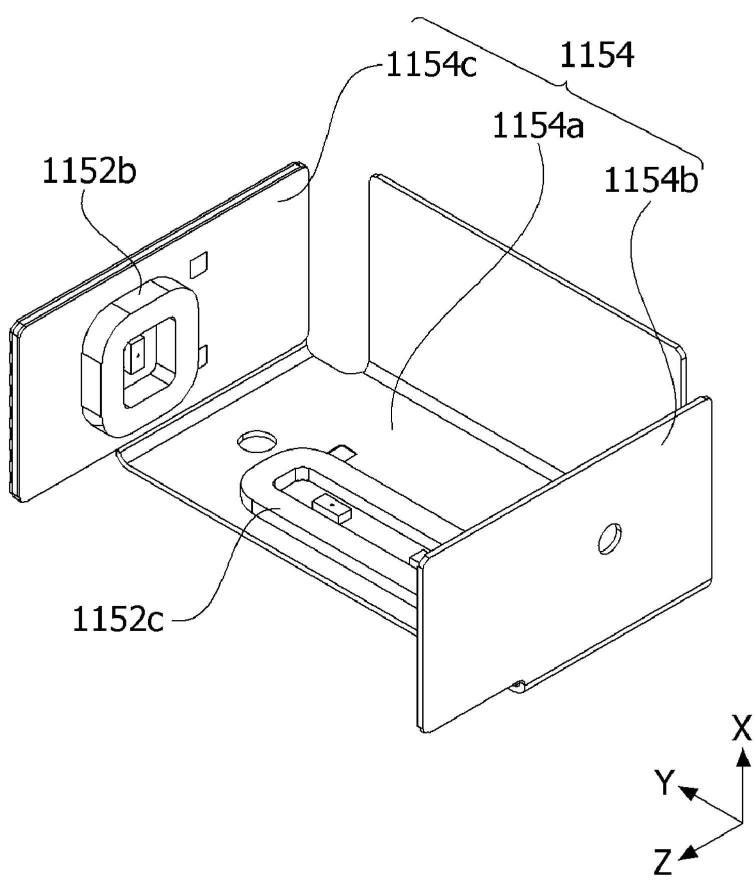
FIG. 20 is a perspective view from the other side of the first driving unit (not including some components) according to the embodiment.

FIG. 13A is a perspective view of a circuit board, a first driving unit (not including some components), and a second driving unit (not including some components) according to the embodiment, FIG. 13B is a conceptual diagram for describing the connection of the circuit board, the first driving unit (not including some components), and the second driving unit (not including some components) according to the embodiment, FIG. 13C is a conceptual diagram for describing the connection of a circuit board, a first driving unit (not including some components), and a second driving unit (not including some components) according to a modified example, FIG. 13D is a conceptual diagram for describing the connection of a circuit board, a first driving unit (not including some components), and a second driving unit (not including some components) according to another embodiment, FIG. 13E is a conceptual diagram for describing the connection of a circuit board, a first driving unit (not including some components), and a second driving unit (not including some components) according to still another embodiment, FIG. 14 is a perspective view of the circuit board according to the embodiment, FIG. 15 is an inner plan view of the unfolded circuit board according to the embodiment, FIG. 16 is an outer plan view of the unfolded circuit board according to the embodiment, FIG. 17 is a perspective view from one side of the second driving unit (not including some components) according to the embodiment, FIG. 18 is a perspective view from the other side of the second driving unit (not including some components) according to the embodiment, FIG. 19 is a perspective view from one side of the first driving unit (not including some components) according to the embodiment, and FIG. 20 is a perspective view from the other side of the first driving unit (not including some components) according to the embodiment.

Referring to FIG. 13A, the main board unit (corresponding to "circuit board") 1300 according to the embodiment may surround at least a portion of the side surface of the above-described second camera actuator. For example, the main board unit 1300 may come into contact with the side surfaces of the second camera actuator.

In addition, the second board unit 1270 according to the embodiment may be disposed on the side surfaces of the second camera actuator. For example, the second board unit 1270 may come into contact with the side surfaces of the second camera actuator.

In addition, the first board unit 1154 according to the embodiment may be disposed on the side surface of the first camera actuator. For example, the first board unit 1154 may come into contact with the side surface of the first camera actuator.

Specifically, the image sensor may be mounted on the main board unit 1300. The main board unit 1300 may include the first unit main board 1310 overlapping the second camera actuator in the optical axis direction (Z-axis direction) and the second and third unit main boards 1320 and 1330 extending from the first unit main board 1310 to the side surfaces of the second camera actuator. The image sensor may be mounted on the first unit main board 1310. In particular, the second and third unit main boards may include the second unit main board 1320 and the third unit main board 1330 facing each other with respect to the optical axis or optical axis direction.

In addition, at least one of the second unit main board 1320 and the third unit main board 1330 according to the embodiment may extend in the optical axis direction to surround the first camera actuator. Hereinafter, the third unit main board 1330 may extend in the optical axis direction to surround the first camera actuator. For example, at least a portion of the third unit main board 1330 may overlap the first camera actuator in the second direction (Y-axis direction).

Any one of the second unit main board 1320 and the third unit main board 1330 may be connected to the connector unit CN.

In addition, the second unit main board 1320 and the third unit main board 1330 may each be connected to an end portion of the main board unit 1300 and may extend in the third direction (Z-axis direction). In other words, the second unit main board 1320 and the third unit main board 1330 may be bent at the main board unit 1300 and may extend in the third direction.

The main board unit 1300, the second unit main board 1320, and the third unit main board 1330 may have an integrated or separated structure.

Furthermore, the main board unit 1300, the second unit main board 1320, and the third unit main board 1330 may be formed of a plurality of layers. Furthermore, the main board unit 1300, the second unit main board 1320, and the third unit main board 1330 may be formed of a hole or a plurality of layers for circuit patterns therein.

For example, the main board unit 1300, the second unit main board 1320, and the third unit main board 1330 may have the rigid PCB and the flexible PCB disposed in a plurality of layers. For example, the main board unit 1300 may have a structure in which the flexible PCB, the rigid PCB, and the flexible PCB are stacked sequentially. In addition, a reinforcer or reinforcement plate may be additionally disposed in areas of the main board unit 1300, the second unit main board 1320, and the third unit main board 1330, on which the flexible PCB is disposed. For example, the reinforcement plate may be additionally disposed above or under the main board unit 1300.

In addition, in the specification, the second unit main board or third unit main board may be formed of the flexible PCB. In addition, the rigid PCB may be disposed at an inner side and/or outer side of the flexible PCB on the second unit main board and the third unit main board. In this case, a first side surface area and a second side surface area may correspond to an area of the second unit main board or third unit main board, on which the rigid PCB is disposed.

In addition, the second board unit 1270 may include the second board 1271 and the third board 1272. The second board 1271 may face the second unit main board 1320 and come into contact with a portion of the second unit main board 1320. In addition, the third board 1272 may face the third unit main board 1330 and come into contact with a portion of the third unit main board 1330.

The second board 1271 and the third board 1272 may be symmetrically disposed with respect to the optical axis or optical axis direction. Furthermore, the second board 1271 and the third board 1272 may be electrically connected to the fourth coil and the fifth coil, respectively. In addition, the second board 1271 and the third board 1272 may each face the side surface of the second actuator.

The first board unit 1154 may include a first sub-board 1154*a* disposed on the bottom surface of the first camera actuator and a second sub-board 1154*b* and a third sub-board 1154*c* each disposed on the side surface of the first camera actuator.

As described above, the first sub-board 1154*a* may be disposed on the lower portion of the first camera actuator and may overlap at least a portion of the first camera actuator in the first direction (X-axis direction).

The second sub-board 1154*b* and the third sub-board 1154*c* may surround the side surfaces of the first camera actuator. In addition, the second sub-board 1154*b* and the third sub-board 1154*c* may be in contact with at least a portion of the side surface of the first camera actuator.

The second sub-board 1154*b* and the third sub-board 1154*c* may be symmetrically disposed with respect to the optical axis or optical axis direction. The second sub-board 1154*b* may be disposed adjacent to the above-described first housing side portion. In addition, the third sub-board 1154*c* may be disposed adjacent to the above-described second housing side portion.

In addition, the second sub-board 1154*b* may be disposed adjacent to the second board 1271. For example, at least a portion of the second sub-board 1154*b* may overlap the second board 1271 in the optical axis direction.

In addition, the third sub-board 1154*c* may be disposed adjacent to the third board 1272. For example, at least a portion of the third sub-board 1154*c* may overlap the third board 1272 in the optical axis direction. Furthermore, at least a portion of the third sub-board 1154*c* may come into contact with the third unit main board 1330. In addition, the third sub-board 1154*c* may be surrounded by the third unit main board 1330.

Additionally, the first camera actuator may include the first boards 1154*b* and 1154*c* having a first terminal part. The first terminal part may be soldered to the third unit main board 1330 to be described below. In the specification, the first board of the first actuator may be any one of the second sub-board 1154*b* and the third sub-board 1154*c*. For example, the first board of the first actuator may be the second sub-board 1154*b*.

In addition, the second camera actuator 1200 may be coupled to the first camera actuator. In addition, the second camera actuator 1200 may include the second board and the third board. The second board is the second board 1271 of the second camera actuator 1200. In addition, the third board of the second camera actuator 1200 is the third board 1272.

In addition, any one of the second board 1271 and the third board 1272 may include the second terminal part and a third terminal part. For example, the third board 1272 (or the second board) of the second camera actuator may include at least one of the second terminal part and the third terminal part. The first terminal part of the first board 1154*b* of the above-described first actuator may correspond to a first terminal part SG4. In addition, in the third board 1272 of the second actuator, the second terminal part and the third terminal part may correspond to the second terminal part (or the third terminal part) SG2. Through the second terminal part (or the third terminal part) SG2, the main board unit (first unit main unit) on which the image sensor is disposed may come into contact with the second unit main board or third unit main board.

Furthermore, the second and third terminal parts SG2 may be disposed on at least one of the second board 1271 and the third board 1272. In various embodiments below, the second and third terminal parts SG2 may be disposed on the second board 1271 or third board 1272 in various cases. Furthermore, the second board 1271 and the third board 1272 may be electrically connected through a connection board. Therefore, as illustrated in FIG. 13D or 13E, the second and third terminal parts SG2 may be disposed on the second board 1271 or third board 1272. Furthermore, correspondingly, the second and third main terminal parts SG1 may be disposed on at least one of the second unit main board 1320 and the third unit main board 1330.

Further referring to FIG. 13B, the second unit main board 1320 may extend in the optical axis direction to correspond to the first board 1154*b*. In other words, the second unit main board 1320 may be disposed to correspond to the first board 1154*b*. In addition, the third unit main board 1330 may be disposed to correspond to the third board 1272. Therefore, the third unit main board 1330 may extend to a region corresponding to the third board 1272. Therefore, a length of the second unit main board 1320 in the optical axis direction may be larger than or equal to that of the third unit main board 1330.

In addition, in the present embodiment, the second and third terminal parts SG2 may be disposed on the second unit main board 1320 and the third unit main board 1330, respectively. Therefore, the second terminal part and the third terminal part may be disposed symmetrically with respect to the optical axis. Furthermore, the second board 1271 and the third board 1272 may move the first lens assembly and the second lens assembly, respectively, in the optical axis direction for zooming or AF.

Furthermore, the second unit main board 1320 may include a first main terminal part SG3 and a second main terminal part SG1. Here, the second main terminal part SG1 may be connected to the second terminal part SG2 on the second board 1271.

In addition, the third unit main board 1330 may include a third main terminal part SG1 connected to the third terminal part SG2 of the third board 1272.

In other words, the second terminal part SG2 of the second and third terminal parts SG2 may be disposed on the second board 1271, and the third terminal part SG2 may be disposed on the third board 1272.

In addition, as described above, the second unit main board 1320 may include the first main terminal part SG3 coupled or soldered to the first terminal part SG4. In addition, the third unit main board 1330 may include the third main terminal part SG1 coupled or soldered to the third terminal part SG2.

Furthermore, the second unit main board 1320 may include the second main terminal part SG1 coupled or soldered to the second terminal part SG2. In addition, as described above, the third unit main board 1330 may include the third main terminal part SG1 coupled or soldered to the third terminal part SG2. The third main terminal part SG1, the third terminal part SG2, the second terminal part SG2, and the second main terminal part SG1 may be disposed sequentially in the second direction. Furthermore, the second and third main terminal parts SG1 may be symmetrically disposed with respect to the optical axis. In addition, the second and third terminal parts SG2 may be symmetrically disposed with respect to the optical axis.

In addition, in the specification, the first terminal part SG4 may be electrically connected to the first main terminal part SG3. In addition, the second terminal part SG2 may be electrically connected to the second main terminal part SG1. In addition, the third terminal part SG2 may be electrically connected to the third main terminal part SG1. The following description may be applied to this electrical connection.

For example, the first main terminal part SG3 may be positioned on a surface opposite to a surface facing the outer surface of the first side portion of the first actuator. In other words, the first terminal part SG4 and the first main terminal part SG3 may be positioned on the outer surface of the first board 1154*b* and the outer surface of the second unit main board 1320, respectively.

In addition, the second and third main terminal parts SG1 may be positioned on a surface opposite to the surface facing the outer surface of the first side portion (or the second side portion) of the second actuator. In other words, the second and third terminal parts SG2 and the second and third main terminal parts SG1 may be positioned on the outer surfaces of the second and third boards 1271 and 1272 and the outer surfaces of the second and third unit main boards 1320 and 1330, respectively.

Referring to FIG. 13C, as a modified example, the first terminal part SG4 of the first board 1154*b* may be positioned to correspond to the first main terminal part SG3 of the second unit main board 1320. In addition, the second terminal part SG2 may be disposed on the second board 1271.

In this case, the second unit main board 1320 may be a portion bent at the first unit main board 1310 on which the image sensor is disposed and extending in the optical axis direction. In other words, the second unit main board 1320 may be integrated with the first unit main board 1310. Therefore, the second unit main board 1320 may be a second main board, and the first unit main board 1310 may be a first main board.

In addition, as described above, the second unit main board 1320 may include the first main terminal part SG3 formed at a position corresponding to the first terminal part SG4, and the second main terminal part SG1 formed at a position corresponding to the second terminal part SG2. That is, it is possible to simply design the main board. Furthermore, it is possible to easily reduce the manufacturing costs of the main board or the like. The contents applied to the description of the specification may be applied to other contents in the same manner. For example, according to the present embodiment, only one of the first lens assembly and the second lens assembly may move in the optical axis direction.

Referring to FIG. 13D, as another embodiment, the first terminal part SG4 of the first board 1154*b* may be positioned to correspond to the first main terminal part SG3 of the second unit main board 1320. In addition, the third terminal part SG2 may be disposed on the third board 1272.

In other words, the second terminal part SG2 may not be positioned on the second board 1271. In addition, the third terminal part SG2 may be disposed on the third board 1272, and the third main terminal part SG1 may be disposed on the third unit main board 1330. The third main terminal parts SG1 may be positioned to correspond to the third terminal part SG2.

In addition, the third terminal part SG2 may be soldered or coupled to the third main terminal part SG1 or connected thereto through a connector or the like. Hereinafter, the contents applied to the description of the specification may be applied to other contents in the same manner.

Referring to FIG. 13E, as still another embodiment, the first terminal part SG4 of the first board 1154*b* may be positioned to correspond to the first main terminal part SG3 of the second unit main board 1320. In addition, the second terminal part SG2 may be disposed on the second board 1271.

In other words, the second terminal part SG2 may be positioned on the second board 1271. In addition, the third board 1272 may not be present.

Furthermore, the second terminal part SG2 may be disposed on the second board 1271, and the second main terminal part SG1 may be disposed on the second unit main board 1320. The second main terminal part SG1 may be positioned to correspond to the second terminal part SG2.

In addition, the third unit main board 1330 facing the second unit main board 1320 may be further disposed. In this case, the third unit main board 1330 may be disposed on the second side portion of the first actuator. The second side portion is an opposite area of the above-described first side portion.

In addition, the first main terminal part SG3 may be positioned on the surface opposite to the surface facing the outer surface of the first side portion of the first actuator. In addition, the second main terminal part SG1 may be positioned on a surface opposite to a surface facing the outer surface of the first side portion of the second actuator.

Therefore, in the above-described various embodiments, the first actuator may be coupled to an optical member (prism), and the second actuator may be coupled to a lens. However, conversely, depending on the structure, the first actuator may be coupled to the lens, and the second actuator may be coupled to the prism.

Furthermore, the second and third main terminal parts SG1 may include a groove exposing a portion of the second and third terminal parts SG2. In addition, the first main terminal part SG3 may include a groove exposing a portion of the first terminal part SG4. In other words, the second and third terminal parts SG2 may be exposed by the second and third main terminal parts SG1. This may correspond to a first exposed area to be described below. In addition, the first terminal part SG4 may be exposed by the first main terminal part SG3. This may correspond to a second exposed area to be described below.

Furthermore, the main terminal parts and the terminal parts may be electrically connected by a conductive member or an electrically conductive member. For example, the first main terminal part may be connected to the first terminal part by the electrically conductive member. This may be applied to the second and third terminal parts and the second and third terminal parts in the same manner. For example, the electrically conductive member may be coupled to the second main terminal part, a bonding groove of the second main terminal part, and the second terminal part.

Furthermore, the first main terminal part SG3 and the first terminal part SG4 may be connected by a connector. This may be applied to the main terminal parts and the terminal parts.

In addition, the second and third terminal parts SG2 may be soldered or coupled to the second and third main terminal parts SG1 or connected thereto through a connector or the like. Hereinafter, the contents applied to the description of the specification may be applied to other contents in the same manner.

Further referring to FIG. 14, the third unit main board 1330 of the second and third unit main boards according to the embodiment may include a first side surface area RA1 extending in the optical axis direction and coming into contact with at least a portion of the second board unit 1270 in the second direction, a second side surface area RA2 extending in the optical axis direction and coming into contact with at least a portion of the first board unit 1154 in the second direction, and a second connecting area BA2 disposed between the first side surface area RA1 and the second side surface area RA2. In addition, the second and third unit main board (third unit main board) may further include a first connecting area BA1 disposed between the first side surface area RA1 and the first unit main board 1310. In addition, as described above, the first side surface area RA1 and the second side surface area RA2 may correspond to areas in which the rigid PCB is disposed at an inner side and/or an outer side of the flexible PCB on the second unit main board 1320 or third unit main board 1330.

In the specification, the second unit main board may include the first main terminal part or first main terminal part SG3 coupled (or soldered/connected) to the first terminal part (corresponding to SG4). In addition, the third unit main board may include the third main terminal part or second main terminal part (or the third main terminal part) SG1 coupled (or "soldered" or "connected") to the third terminal part (corresponding to SG2). In other words, the first main terminal part may correspond to the first main terminal part SG3, and the third terminal part may correspond to the second terminal part (or the third terminal part) SG2.

The first side surface area RA1 according to the embodiment may overlap the fourth and fifth coils in the second direction (Y-axis direction). In addition, the second side surface area RA2 according to the embodiment may overlap the first and second coils in the second direction (Y-axis direction).

In addition, the first connecting area BA1, the first side surface area RA1, the second connecting area BA2, and the second side surface area RA2 may be sequentially far from the first unit main board 1310. In other words, the second side surface area RA2, the second connecting area BA2, the first side surface area RA1, and the first connecting area BA1 may be sequentially disposed in the optical axis direction on the second and third unit main boards (third unit main board).

The first connecting area BA and the second connecting area BA2 may be made of different materials from the first side surface area RA1 and the second side surface area RA2. Alternatively, as described above, the first connecting area BA1 and the second connecting area BA2 may be formed of the flexible PCB (FPCB) without the rigid PCB (RPCB). Alternatively, the first connecting area BA1 and the second connecting area BA2 may be more flexible than the first side surface area RA1. For example, the first connecting area BA1 and the second connecting area BA2 may be an area in which the FPCB is disposed, and the first side surface area RA1 and the second side surface area RA2 may be an area in which the RPCB is disposed or an area in which the RPCB is additionally disposed. With this configuration, since the FPCB absorbs an impact or the like, it is possible to block the above-described boards (the circuit board, the first board unit, and the second board unit) of the camera module according to the embodiment from being disconnected or separated due to movements of electronic devices, such as shaking. Furthermore, the second connecting area BA2 may also have an inward step. Therefore, it is possible to increase the coupling strength between the first actuator, the second actuator, and the main board (e.g., the second unit main board).

In addition, the first connecting area BA1 and the second connecting area BA2 according to the embodiment may have steps with the first side surface area RA1 and the second side surface area RA2. For example, the first connecting area BA1 and the second connecting area BA2 may be spaced a predetermined distance from the first side surface area RA1 and the second side surface area RA2 in the second direction (Y-axis direction).

Furthermore, the first side surface area RA1 and the second side surface area RA2 may be spaced a predetermined distance from each other in the second direction (Y-axis direction). Therefore, the second connecting area BA2 may have a step. In addition, as described above, since the second connecting area BA2 may be formed of the FPCB, it is possible to design a board that is flexible to the separation between the first side surface area RA1 and the second side surface area RA2.

In addition, the first side surface area RA1 may come into contact with the second board unit in the optical axis direction. In addition, the second side surface area RA2 may come into contact with the first board unit in the optical axis direction.

Further referring to FIGS. 15 and 16, the second and third unit main boards 1320 and 1330 may include a board inner surface 1330*a* facing the second board unit 1270, and a board outer surface 1330*b* that is a surface opposite to the board inner surface 1330*a*.

The board inner surface 1330*a* may face the second board or third sub-board as described above. Therefore, the board inner surface 1330*a* may come into contact with a portion of the second board or third sub-board as described above.

In addition, the first side surface area RA1 may include a first side surface hole 1330*h*1. The first side surface hole 1330*h*1 may be coupled to the second board and the second camera actuator through the protrusion of the second camera actuator or the like. In addition, the second side surface area RA2 may include a second side surface hole 1330*h*2. The second side surface hole 1330*h*2 may be coupled to the third sub-board and the first camera actuator through the protrusion of the first camera actuator or the like.

The second main terminal part (or the third main terminal part) may be disposed on the board outer surface 1330*b*. The second terminal part (or the third terminal part) SG1 may be disposed along an edge of the board outer surface 1330*b*. In the specification, the bonding groove (first to third terminal parts) may be an area electrically connected to the disposed board, and electrode patterns may be exposed to the outside.

For example, the electrode pattern exposed from the bonding groove may be connected to various circuit elements or adjacent boards.

In an embodiment, a length L1 of the first side surface area RA1 in the optical axis direction may be larger than a length L2 of the second side surface area RA2 in the optical axis direction. For example, an area of the second unit main board overlapping the second board 1271 (e.g., in the second direction) may be larger than an area of the second unit main board not overlapping the second board 1271.

In addition, the length L1 of the first side surface area RA1 in the optical axis direction may be larger than a length L3 of the second side surface area RA1 in the first direction. The second main terminal part (or the third main terminal part) SG1 may be disposed at a long side rather than a short side among edges of the first side surface area RA1. With this configuration, it is possible to easily secure an arrangement space of the electrically connected second main terminal part (or the third main terminal part) SG1 on the second and third unit main boards. Therefore, it is possible to easily prevent the occurrence of a short circuit and enable various electrical designs.

In addition, the first main terminal unit SG3 may be disposed on the board outer surface 1330*b*. In addition, the length L2 of the second side surface area RA2 in the optical axis direction may be larger than a length L4 of the second side surface area RA2 in the optical axis direction. In addition, the first main terminal part SG3 may be disposed on a long side rather than a short side among edges of the second connecting area RA2. Therefore, it is possible to suppress the occurrence of the short circuit and facilitate the electrical design. In addition, as will be described below, the second main terminal part (or the third main terminal part) SG1 may be disposed on the second unit main board or third unit main board, and the second terminal part (or the third terminal part) SG2 may be disposed on the second board 1271 or third board 1272. In other words, the second main terminal part (or the third main terminal part) SG1 may be disposed on any one of the second unit main board 1320 and the third unit main board 1330. In addition, the second terminal part (or the third terminal part) SG2 may be disposed on any one of the second board 1271 and the third board 1272 of the second camera actuator. In addition, the first main terminal part SG3 and the first terminal part SG4 are not positioned on the second and third unit main boards because they are far from the main board unit, and may be connected to the first board unit through various connectors.

In addition, the second main terminal part (or the third main terminal part) SG1 may be disposed on the board inner surface 1330*a*. As described above, the second main terminal part (or the third main terminal part) SG1 may be disposed at an edge of the board inner surface 1330*a*. For example, the second main terminal part (or the third main terminal part) SG1 may be disposed at an edge of the board inner surface 1330*a* of the second unit main board 1320 or the third unit main board 1330. In addition, the second main terminal part (or the third main terminal part) SG1 may be disposed at the long side among the edges of the first side surface area RA1. Furthermore, in a modified example, the second main terminal part (or the third main terminal part) SG1 may be disposed at the long side and/or the short side among the edges of the first side surface area RA1 on the board inner surface 1330*a*.

In addition, the first main terminal part SG3 may be disposed on the board inner surfaces of the second and third unit main boards 1330. The first main terminal part SG3 may be disposed on the board inner surface 1330*a* of the second unit main board 1320 or third unit main board 1330. For example, as described above, the first main terminal part SG3 may be disposed at the edge of the board inner surface 1330*a* of the third unit main board 1330. In addition, the first main terminal part SG3 may be disposed on the long side among the edges of the second side surface area RA2 on the board inner surface 1330*a*. Likewise, the first main terminal part SG3 may be disposed at the long side and/or the short side among the edges of the second side surface area RA2 on the board inner surface 1330*a*. For example, the first main terminal part SG3 may be disposed at the short side among the edges of the second side surface area RA2 on the board inner surface 1330*a* and misaligned with the extending direction of the second main terminal part (or the third main terminal part) SG1. For example, the second main terminal part (or the third main terminal part) SG1 may extend in the first direction (X-axis direction) in the first side surface area RA1, but the first main terminal part SG3 may extend in the optical axis direction or third direction (Z-axis direction) in the second side surface area RA2. As described above, the main board unit may be electrically connected to the first camera actuator and the second camera actuator through the second unit main board 1320 or third unit main board 1330. Therefore, one or more driving drivers IC may be mounted on the main board unit. In other words, the number of mounted driving drivers may be easily adjusted. Furthermore, since the main board unit is electrically connected to the first camera actuator and the second camera actuator using one second unit main board and one third unit main board, it is possible to eliminate the individual electrical connection structure, thereby simplifying the bonding process and reducing impact vulnerability due to bonding.

In other words, the second main terminal part (or the third main terminal part SG1 and the first main terminal part SG3 may be disposed on the board inner surface 1330*a* and the board outer surface 1330*b* on the second and third unit main boards. With this configuration, the first board unit or second board unit may be easily coupled to the second and third unit main boards through a conductive member (or an electrically conductive member) to be described below, and it is possible to provide an increased coupling strength. The conductive member to be described below may be made of various materials such as an electrically conductive material. For example, the conductive member may include metal. However, the present invention is not limited to this material.

Referring to FIGS. 17 and 18, the second board unit 1270 according to the embodiment may include the second board 1271 and the third board 1272 as described above. The second terminal part (or the third terminal part) SG2 may be disposed on an outer surface 1272*a* of the third board 1272.

In addition, the second board 1271 and the third board 1272 may be disposed inside the second and third unit main boards 1320 and 1330. Therefore, the second terminal part (or the third terminal part) SG1 may be disposed inside the second main terminal part (or the third main terminal part) SG1.

In addition, the fourth coil 1251*a* may be disposed on an inner surface 1271*b* of the second board 1271. The fourth coil 1251*a* may be mounted on and electrically connected to the inner surface 1271*b* of the second board 1271. In addition, the fifth coil 1251*b* may be disposed on an inner surface 1272*b* of the third board 1272. The fifth coil 1251*b* may be mounted on and electrically connected to the inner surface 1272*b* of the third board 1272.

The outer surface 1271*a* of the second board 1271 may face the second unit main board 1320. The outer surface 1272*a* of the third board 1272 may face the third unit main board 1330.

Referring to FIGS. 19 and 20, the first sub-board 1154*a* may be connected to the second sub-board 1154*b* and the third sub-board 1154*c* disposed on the side surfaces of the first camera actuator. The first sub-board 1154*a*, the second sub-board 1154*b*, and the third sub-board 1154*c* of the first board unit 1154 may have an integrated or separated structure. In addition, the first sub-board 1154*a*, the second sub-board 1154*b*, and the third sub-board 1154*c* may be connected through circuit patterns or the like. In addition, a processor, a driver IC, and the like may be disposed on any one of the first sub-board 1154*a*, the second sub-board 1154*b*, and the third sub-board 1154*c*. In addition, the processor and the driver IC may supply a current to each of the coils mounted on the first sub-board 1154*a*, the second sub-board 1154*b*, and the third sub-board 1154*c*.

The third coil 1152*c* may be disposed on the first sub-board 1154*a* according to the embodiment. In addition, the first coil 1152*a* may be disposed on the second sub-board 1154*b*. In addition, the second coil 1152*b* may be disposed on the first sub-board 1154*a*.

In addition, the outer surface of the second sub-board 1154*b* may be positioned to correspond to the inner surface of the third unit main board 1154*b*. In addition, at least a portion of the second sub-board 1154*b* may come into contact with the third unit main board 1154*b*.

Figure 21:
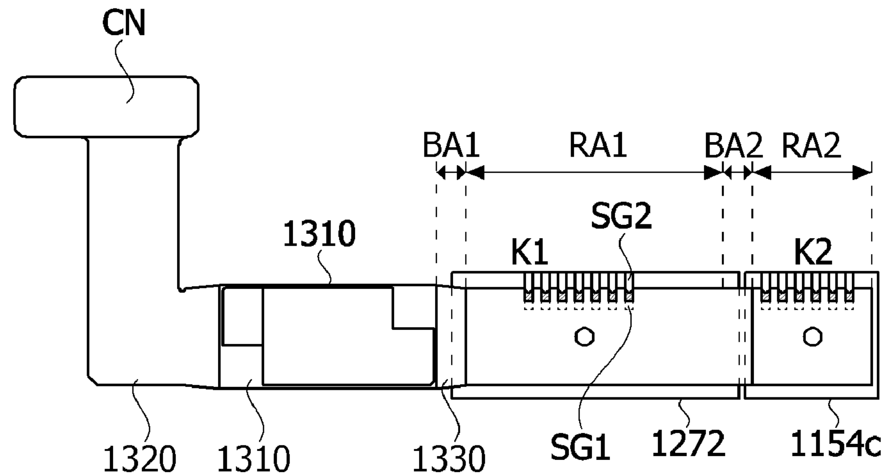
FIG. 21 is an outer unfolded plan view of a circuit board, a first board unit, and a second board unit according to the embodiment.
Figure 22:
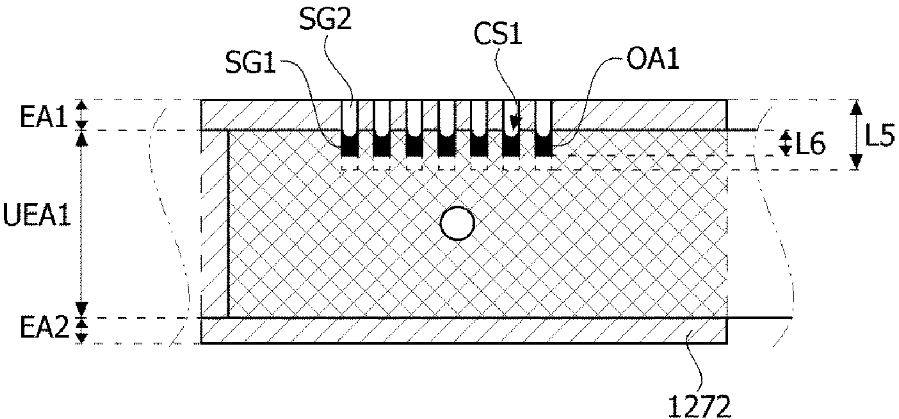
FIG. 22 is an enlarged view of portion K1 in FIG. 21.
Figure 23:
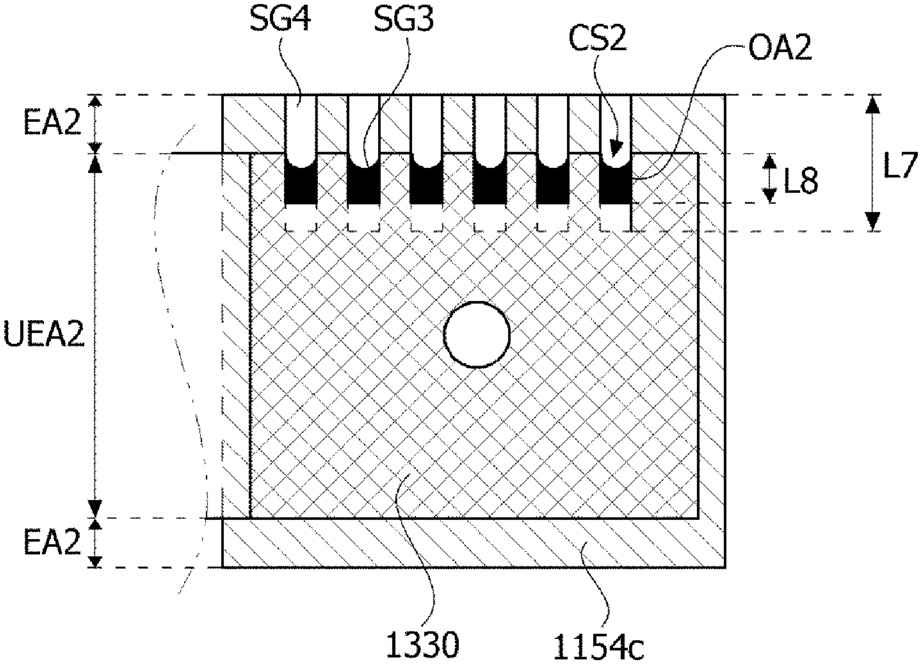
FIG. 23 is an enlarged view of portion K2 in FIG. 21.

FIG. 21 is an outer unfolded plan view of a circuit board, a first board unit, and a second board unit according to the embodiment, FIG. 22 is an enlarged view of portion K1 in FIG. 21, and FIG. 23 is an enlarged view of portion K2 in FIG. 21.

Referring to FIGS. 21 to 23, the second board unit 1270 may include a first exposed area EA1 exposed by the main board unit 1310. In addition, the second board unit 1270 may include a first unexposed area UEA1 other than the first exposed area EA1. The first unexposed area UEA1 may be an area in which the second board unit 1270 overlaps the third unit main board 1330 in the second direction (Y-axis direction).

In addition, the second main terminal part (or the third main terminal part) SG1 may be disposed outside the second board unit 1270. Furthermore, the second main terminal part (or the third main terminal part) SG1 may be disposed in the first exposed area EA1. The outer surface of the second main terminal part (or the third main terminal part) SG1 may be convex inward or concave outward (CS1). With this configuration, the conductive member may be easily filled into the second main terminal part (or the third main terminal part) SG1.

In addition, the second terminal part (or the third terminal part) SG2 may be disposed inside the second main terminal part (or the third main terminal part) SG1. For example, the second terminal part (or the third terminal part) SG2 may be disposed under the second main terminal part (or the third main terminal part) SG1. The second main terminal part (or the third main terminal part) SG1 may overlap the second terminal part (or the third terminal part) SG2 in the second direction (Y-axis direction).

A length L6 of the second main terminal part (or the third main terminal part) SG1 in the first direction (X-axis direction) may be smaller than a length L5 of the second terminal part (or the third terminal part) SG2 in the first direction (X-axis direction). With this configuration, when the conductive member is applied to the second main terminal part (or the third main terminal part) SG1 and the second terminal part (or the third terminal part) SG2, the conductive member may not flow down therein. Furthermore, the second main terminal part (or the third main terminal part) SG1 and the second terminal part (or the third terminal part) SG2 may be easily coupled by the conductive member.

In addition, at least a portion of the second board unit (third board 1272) may overlap the second main terminal part (or the third main terminal part) SG1 in the vertical direction or the second terminal part (or the third terminal part) SG2 in the first direction (X-axis direction).

In addition, the third sub-board 1154*c* may include a second exposed area EA2 exposed by the main board unit 1310. In addition, the third sub-board 1154*c* may include a second unexposed area UEA2 other than the second exposed area EA2. The second unexposed area UEA2 may be an area in which the third sub-board 1154*c* overlaps the third unit main board 1330 in the second direction (Y-axis direction). Alternatively, the second and third unit main boards (third unit main board) may have a smaller length or thickness in the first direction (X-axis direction) than the third sub-board 1154*c* in at least some areas.

In addition, the first main terminal part SG3 may be disposed outside the third sub-board 1154*c*. Furthermore, the first main terminal part SG3 may be disposed in the second exposed area EA2. For example, the first main terminal part SG3 may be disposed along an edge of the second exposed area EA2. The outer surface of the first main terminal part SG3 may be convex inward or concave outward (CS2). With this configuration, the conductive member may be easily filled into the first main terminal part SG3.

In addition, the first terminal part SG4 may be disposed inside the first main terminal part SG3. For example, the first terminal part SG4 may be positioned under the first main terminal part SG3. The first main terminal part SG3 may overlap the first terminal part SG4 in the second direction (Y-axis direction).

A length L8 of the first main terminal part SG3 in the first direction (X-axis direction) may be smaller than a length L7 of the first terminal part SG4 in the first direction (X-axis direction). With this configuration, when the conductive member is applied to the first main terminal part SG3 and the first terminal part SG4, the conductive member may not flow down therein. Furthermore, the first main terminal part SG3 and the first terminal part SG4 may be easily coupled by the conductive member.

At least a portion of the first terminal part SG4 may overlap the first main terminal part SG3 in the vertical direction (X-axis direction) on the first board unit (third sub-board). Alternatively, at least a portion of the third sub-board 1154*c* may overlap the first main terminal part SG3 in the vertical direction or the first terminal part SG4 in the first direction (X-axis direction).

In addition, the second main terminal part (or the third main terminal part) SG1 may be disposed outside the second terminal part (or the third terminal part) SG2. In addition, the first main terminal part SG3 may be disposed outside the first terminal part SG4. Here, an inward direction between the boards or the bonding grooves may be a direction from the main board unit 1300 toward the first camera actuator or second camera actuator. Conversely, an outward direction may be a direction from the first camera actuator toward the main board or from the second camera actuator toward the main board.

Furthermore, the second terminal part (or the third terminal part) SG2 may be disposed in the first exposed area EA1 and the first unexposed area UEA1. In addition, the first terminal part SG4 may be disposed in the second exposed area EA2 and the second unexposed area UEA2.

In addition, the second main terminal part (or the third main terminal part) SG1 may have a width that differs from or is the same as a width of the second terminal part (or the third terminal part) SG2. Here, the width may be a length in the optical axis direction. For example, the second main terminal part (or the third main terminal part) SG1 may have a smaller width than the second terminal part (or the third terminal part) SG2. Therefore, portions of the second main terminal part (or the third main terminal part) SG1 and the second terminal part (or the third terminal part) SG2 may overlap each other in the second direction (Y-axis direction), and the remaining portions thereof may not overlap each other. In addition, with this configuration, it is possible to suppress the occurrence of the electrical connection (short) between the adjacent second main terminal parts (or third main terminal parts) SG1 caused by extension of the conductive member to the second main terminal part (or the third main terminal part) SG1 when the conductive member is applied to the second main terminal part (or the third main terminal part) SG1 and the second terminal part (or the third terminal part) SG2.

Figure 24:
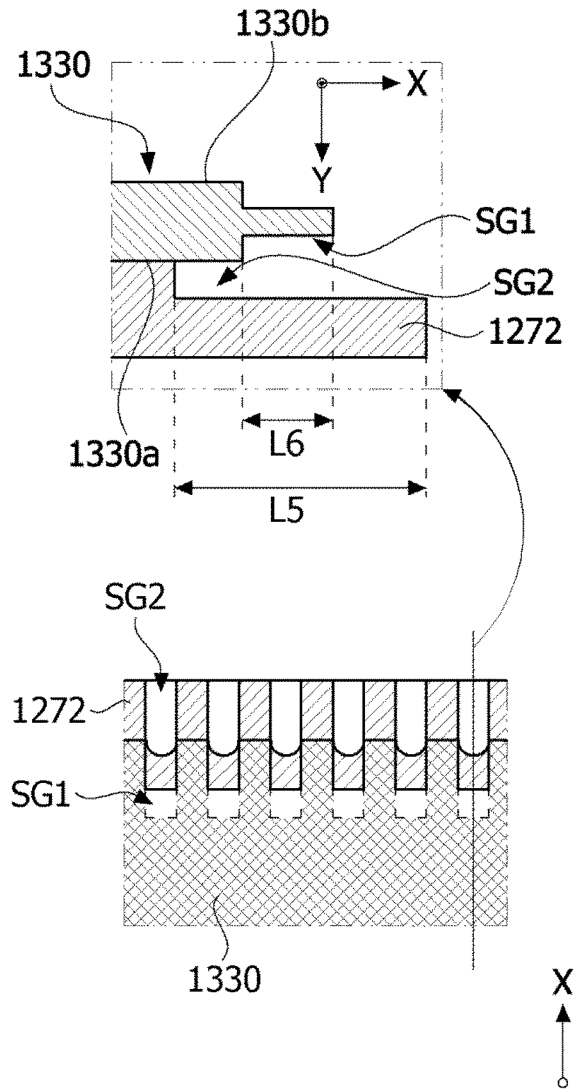
FIG. 24 is a view illustrating the circuit board and the second board unit when a conductive member is not applied.
Figure 25:
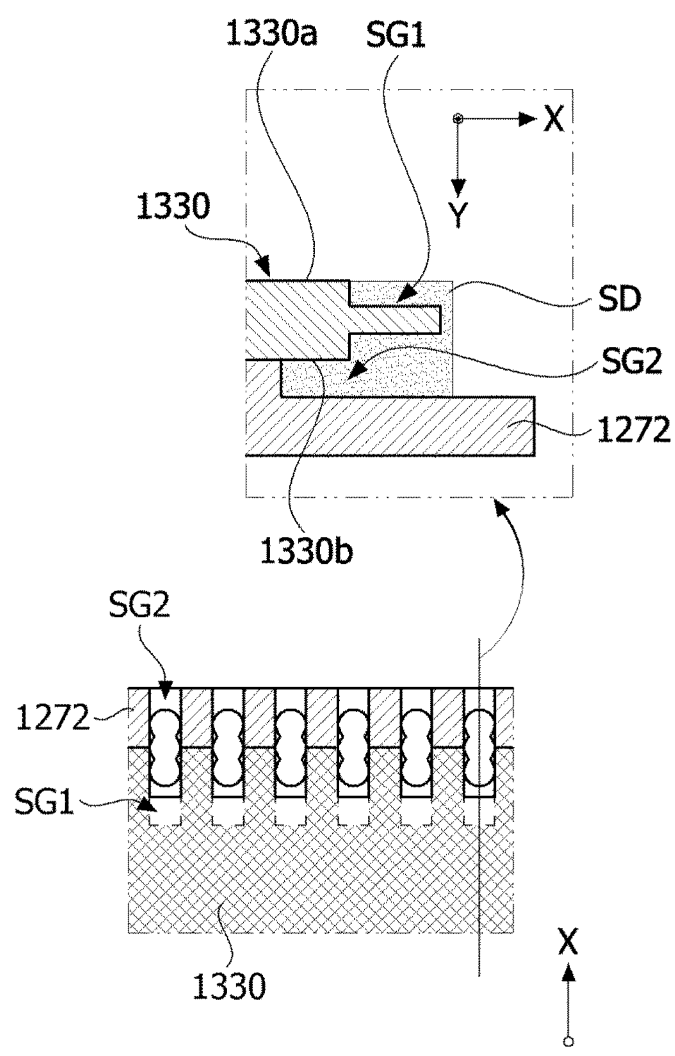
FIG. 25 is a view illustrating the circuit board and the second board unit when the conductive member is applied.

FIG. 24 is a view illustrating the circuit board and the second board unit when a conductive member is not applied, and FIG. 25 is a view illustrating the circuit board and the second board unit when the conductive member is applied.

Referring to FIGS. 24 and 25, as described above, the third unit main board 1330 may be disposed on the third board 1272 in the second direction (Y-axis direction). As described above, the outer surface of the third board 1272 may come into contact with the inner surface 1330*a* of the third unit main board 1330.

As described above, the length L6 of the second main terminal part (or the third main terminal part) SG1 in the first direction (X-axis direction) may be smaller than the length L5 of the second terminal part (or the third terminal part) SG2 in the first direction (X-axis direction). In other words, the second main terminal part (or the third main terminal part) SG1 may overlap the second terminal part (or the third terminal part) SG2 in the second direction (Y-axis direction). Furthermore, the second terminal part (or the third terminal part) SG2 may be disposed in the first exposed area of the third board 1272. However, the first exposed area may be misaligned with or may not overlap the second main terminal part (or the third main terminal part) SG1 in the second direction (Y-axis direction).

A conductive member SD may be disposed on the second main terminal part (or the third main terminal part) SG1 and the second terminal part (or the third terminal part) SG2. Furthermore, the conductive member SD may be disposed on the second main terminal part (or the third main terminal part) SG1 positioned on the board outer surface 1330*b* of the third unit main board 1330. In addition, the conductive member SD may be disposed between the second main terminal part (or the third main terminal part) SG1 positioned on the board inner surface 1330*a* of the third unit main board 1330 and the second terminal part (or the third terminal part) SG2. This may also be applied to the first main terminal part and the first terminal part in the same manner.

Figure 26:
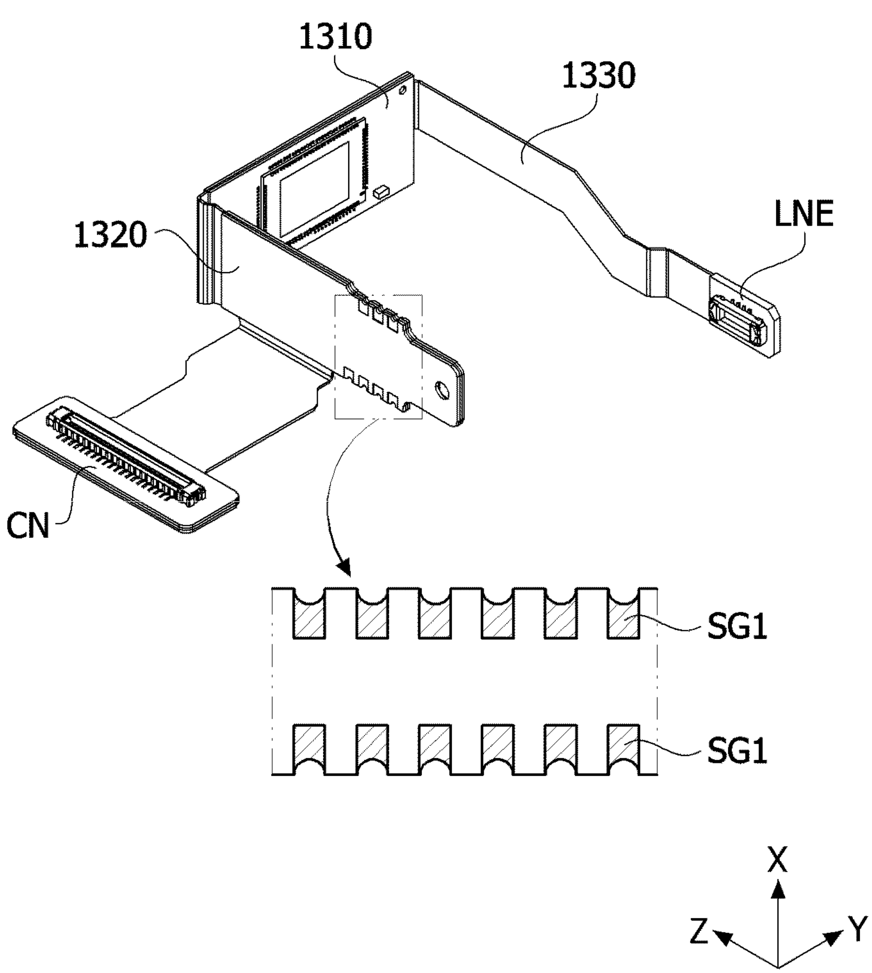
FIG. 26 is an outer unfolded plan view of a circuit board, a first board unit, and a second board unit according to another embodiment.
Figure 27A:
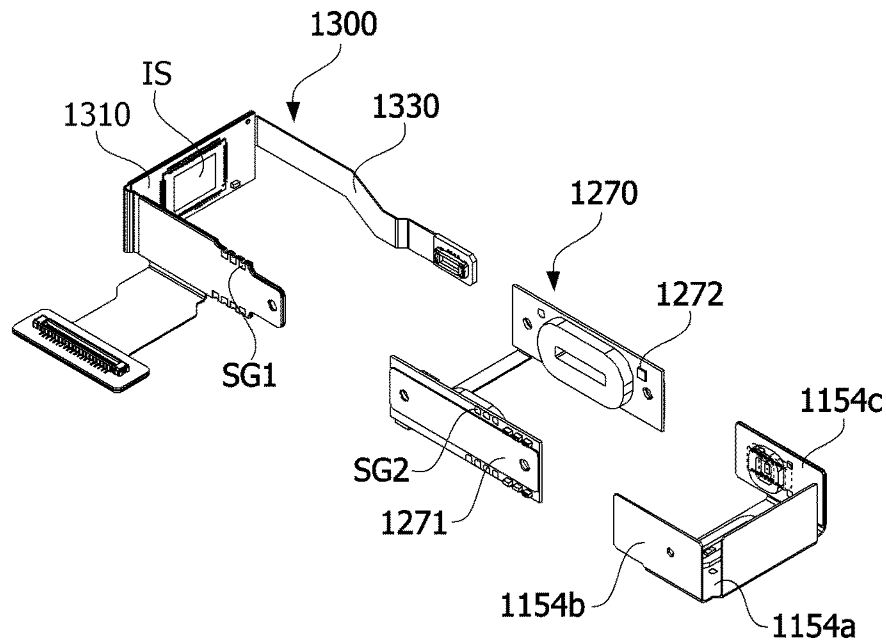
FIG. 27A is a perspective view of a circuit board, a first driving unit (not including some components), and a second driving unit (not including some components) according to another embodiment.
Figure 27B:
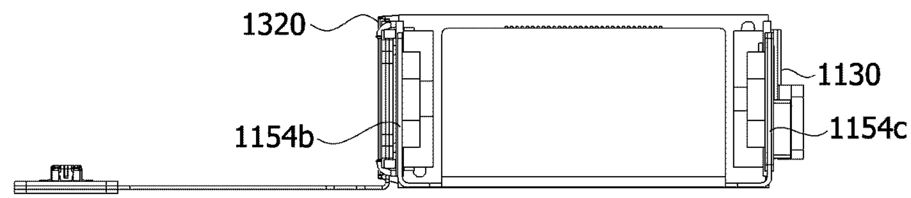
FIG. 27B is a view of FIG. 27A in one direction.
Figure 28:
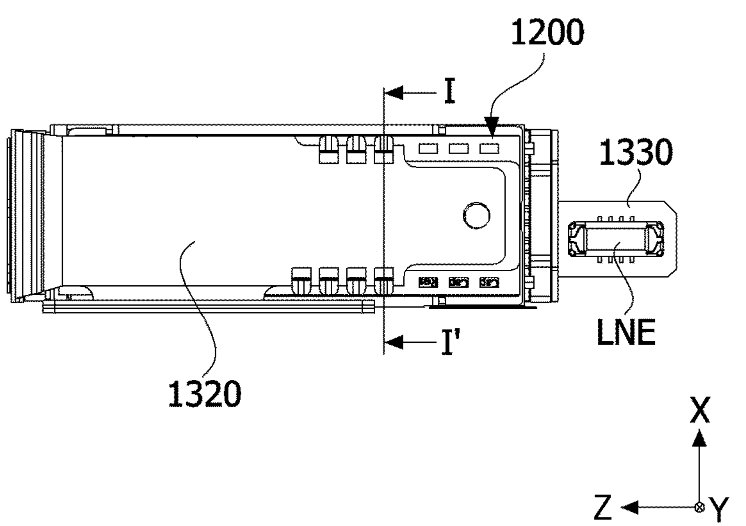
FIG. 28 is a side view of a camera device according to another embodiment.
Figure 29:
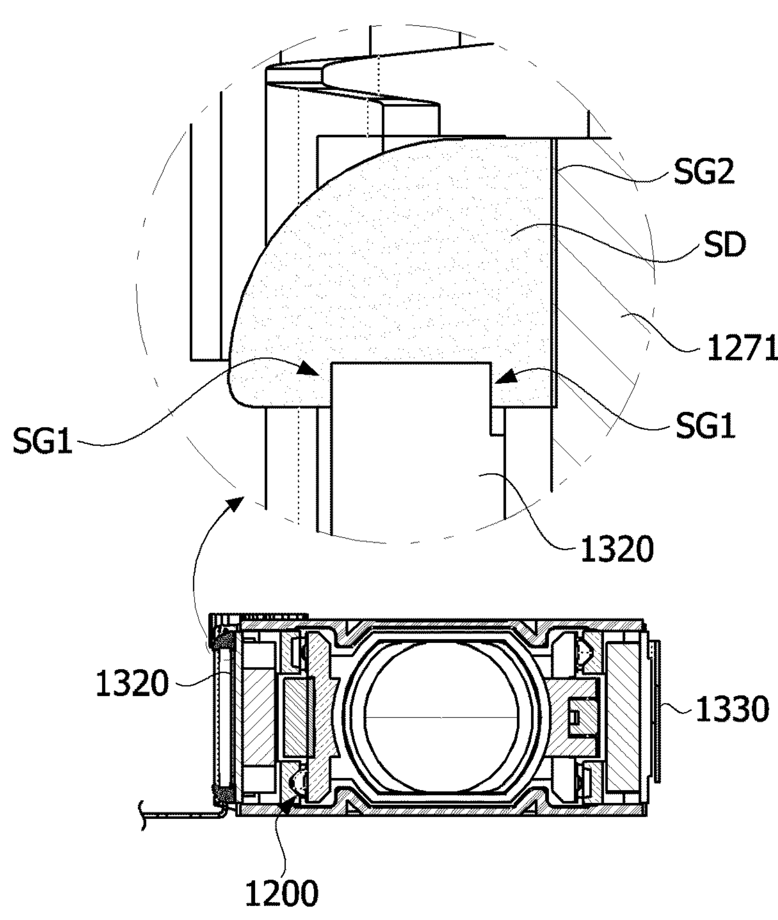
FIG. 29 is a cross-sectional view along line I-I' in FIG. 28.

FIG. 26 is an outer unfolded plan view of a circuit board, a first board unit, and a second board unit according to another embodiment, FIG. 27A is a perspective view of a circuit board, a first driving unit (not including some components), and a second driving unit (not including some components) according to another embodiment, FIG. 27B is a view of FIG. 27A in one direction, FIG. 28 is a side view of a camera device according to another embodiment, and FIG. 29 is a cross-sectional view along line I-I' in FIG. 28.

Referring to FIGS. 26 to 29, a main board unit 1300 according to another embodiment may surround at least portions of the side surfaces of the second camera actuator. For example, the main board unit 1300 may come into contact with the side surfaces of the second camera actuator. In addition, the second board unit 1270 according to the embodiment may be disposed on the side surfaces of the second camera actuator. For example, the second board unit 1270 may come into contact with the side surfaces of the second camera actuator. In addition, the first board unit 1154 according to the embodiment may be disposed on the side surfaces of the first camera actuator. For example, the first board unit 1154 may come into contact with the side surfaces of the first camera actuator.

In a modified example, the main board unit 1300 may come into contact with the side surfaces of the second camera actuator and may not come into contact with the side surfaces of the first camera actuator.

In the present embodiment, the image sensor may be mounted on the main board unit 1300 as described above. The main board unit 1300 may include the first unit main board 1310 overlapping the second camera actuator in the optical axis direction (Z-axis direction) and the second and third unit main boards 1320 and 1330 extending from the first unit main board 1310 to the side surfaces of the second camera actuator. The image sensor may be mounted on the first unit main board 1310. In particular, the second and third unit main boards may include the second unit main board 1320 and the third unit main board 1330 facing each other with respect to the optical axis or optical axis direction. Alternatively, the main board unit 1300 may include only any one of the second unit main board 1320 and the third unit main board 1330.

In addition, at least one of the second unit main board 1320 and the third unit main board 1330 according to the embodiment may extend in the optical axis direction to surround the first camera actuator. Hereinafter, the third unit main board 1330 may extend in the optical axis direction to surround the first camera actuator. For example, at least a portion of the third unit main board 1330 may overlap the first camera actuator in the second direction (Y-axis direction).

Any one of the second unit main board 1320 and the third unit main board 1330 may be connected to the connector unit CN.

In addition, the second unit main board 1320 and the third unit main board 1330 may each be connected to an end portion of the main board unit 1300 and may extend in the third direction (Z-axis direction). In other words, the second unit main board 1320 and the third unit main board 1330 may be bent at the main board unit 1300 and may extend in the third direction. In addition, the main board unit 1300, the second unit main board 1320, and the third unit main board 1330 may have an integrated or separated structure.

In addition, the second board unit 1270 may include the second board 1271 and the third board 1272. The second board 1271 may face the second unit main board 1320 and come into contact with a portion of the second unit main board 1320. In addition, the third board 1272 may face the third unit main board 1330 and come into contact with a portion of the third unit main board 1330.

The second board 1271 and the third board 1272 may be symmetrically disposed with respect to the optical axis or optical axis direction. Furthermore, the second board 1271 and the third board 1272 may be electrically connected to the fourth coil and the fifth coil, respectively. In addition, the second board 1271 and the third board 1272 may each face the side surface of the second actuator.

Furthermore, the first board unit 1154 may include the first sub-board **1154*a* disposed on the bottom surface of the first camera actuator, and the second sub-board 1154*b* and the third sub-board 1154*c*** each disposed on the side surfaces of the first camera actuator.

As described above, the first sub-board **1154*a*** may be disposed on the lower portion of the first camera actuator and may overlap at least a portion of the first camera actuator in the first direction (X-axis direction).

The second sub-board **1154*b* and the third sub-board 1154*c* may surround the side surfaces of the first camera actuator. In addition, the second sub-board 1154*b* and the third sub-board 1154*c*** may be in contact with at least a portion of the side surface of the first camera actuator.

The second sub-board **1154*b* and the third sub-board 1154*c* may be symmetrically disposed with respect to the optical axis or optical axis direction. The second sub-board 1154*b* may be disposed adjacent to the above-described first housing side portion. In addition, the third sub-board 1154*c*** may be disposed adjacent to the above-described second housing side portion.

In addition, the second sub-board **1154*b* may be disposed adjacent to the second board 1271. For example, at least a portion of the second sub-board 1154*b* may overlap the second board 1271** in the optical axis direction.

In addition, the third sub-board **1154*c* may be disposed adjacent to the third board 1272. For example, at least a portion of the third sub-board 1154*c* may overlap the third board 1272 in the optical axis direction. Furthermore, at least a portion of the third sub-board 1154*c* may come into contact with the third unit main board 1330. In addition, the third sub-board 1154*c* may be surrounded by the third unit main board 1330**.

In the present embodiment, the second unit main board 1320 may come into contact with the second board 1271 of the second camera actuator and may be electrically connected to the second board 1271. Therefore, the coil on the second board 1271 may be electrically connected to the second unit main board 1320 and may receive a current from the driver in the main board unit 1300.

In addition, the board inner surface of the second unit main board rather than the above-described third unit main board may face the first board. Therefore, a portion of the board inner surface of the second unit main board may come into contact with the second board as described above. In addition, the board inner surface of the third unit main board may also be connected to the third sub-board. In this case, the third unit main board may be electrically connected to the third sub-board through a connecting terminal such as a connector CNE. In contrast, in the present embodiment, the above-described second main terminal part (or the third main terminal part) may be disposed on the board inner surface (and/or the board outer surface) of the second unit main board. In addition, the second terminal part (or the third terminal part) may be disposed on the outer surface of the second board 1271. In addition, the above-described contents of the second main terminal part (or the third main terminal part) and the second terminal part (or the third terminal part) except for the arrangement position may be applied to the second main terminal part (or the third main terminal part) of the second unit main board and the second terminal part (or the third terminal part) of the first board in the same manner.

In addition, the second unit main board 1320 of the second and third unit main boards according to another embodiment may include the first side surface area RA1 coming into contact with at least a portion of the second board unit 1270 in the optical axis direction, and the first connecting area BA1 disposed between the first side surface area RA1 and the first unit main board 1310.

The first connecting area BA1 may be made of a different material from the first side surface area RA1. Alternatively, the first connecting area BA1 may be more flexible than the first side surface area RA1. For example, the first connecting area BA1 may be the FPCB, and the first side surface area RA1 may be the RPCB. With this configuration, the camera module according to the embodiment can block an open circuit or separation of the above-described boards (the circuit board, the first board unit, and the second board unit) even when an electronic device moves, such as shaking. Furthermore, the first connecting area BA1 may have a step inward.

In addition, the first side surface area RA1 according to another embodiment may overlap the fourth and fifth coils in the second direction (Y-axis direction).

Furthermore, the third unit main board 1330 may extend to the first camera actuator and overlap the second camera actuator and the first camera actuator in the second direction. The third unit main board 1330 may be connected to the third sub-board 1154*c* of the first camera actuator in the connector CNE manner or the like and may not include the above-described first main terminal part.

In addition, as described above, the second terminal part (or the third terminal part) SG1 may be disposed on the board outer surface of the second unit main board 1320. The second main terminal part (or the third main terminal part) SG1 may be disposed along the edge of the board outer surface of the second unit main board 1320. The second main terminal part (or the third main terminal part) and the second terminal part (or the third terminal part) to be described below may be an area electrically connected to the board disposed adjacent thereto, and the electrode pattern may be exposed to the outside. For example, the electrode pattern exposed at the bonding groove may be connected to various circuit elements or adjacent boards.

In addition, the length of the first side surface area RA1 in the optical axis direction may be larger than the length of the second side surface area RA2 in the optical axis direction. In addition, the length of the first side surface area RA1 in the optical axis direction may be larger than the length of the first side surface area RA1 in the first direction. The second main terminal part (or the third main terminal part) SG1 may be disposed at a long side rather than a short side among edges of the first side surface area RA1. With this configuration, it is possible to easily secure an arrangement space of the electrically connected second main terminal part (or the third main terminal part) SG1 on the second and third unit main boards. Therefore, it is possible to easily prevent the occurrence of a short circuit and enable various electrical designs.

In addition, the second main terminal part (or the third main terminal part) SG1 may be disposed on the board inner surface of the second unit main board 1320. As described above, the second main terminal part (or the third main terminal part) SG1 may be disposed at the edge of the board inner surface of the second unit main board 1320. In addition, the second main terminal part (or the third main terminal part) SG1 may be disposed at the long side among the edges of the first side surface area RA1 on the board inner surface of the second unit main board 1320. In other words, the second main terminal part (or the third main terminal part) SG1 may be disposed on the board inner surface and the board outer surface of the second unit main board 1320. With this configuration, the first board unit or second board unit may be easily coupled to the second and third unit main boards through the conductive member to be described below, and it is possible to provide an increased coupling strength.

The second board unit 1270 according to the embodiment may include the second board 1271 and the third board 1272. The second terminal part (or the third terminal part) SG2 may be disposed on the outer surface of the second board 1271.

In addition, the second board 1271 and the third board 1272 may be disposed inside the second and third unit main boards 1320 and 1330. Therefore, the second terminal part (or the third terminal part) SG1 may be disposed inside the second main terminal part (or the third main terminal part) SG1. The second terminal part (or the third terminal part) SG1 and the second main terminal part (or the third main terminal part) SG1 may be disposed to be spaced a predetermined distance from each other in the second direction (Y-axis direction).

In addition, the fourth coil 1251*a* may be disposed on an inner surface 1271*b* of the second board 1271. The fourth coil 1251*a* may be mounted on and electrically connected to the inner surface 1271*b* of the second board 1271. In addition, the fifth coil 1251*b* may be disposed on an inner surface 1272*b* of the third board 1272. The fifth coil 1251*b* may be mounted on and electrically connected to the inner surface 1272*b* of the third board 1272.

The outer surface 1271*a* of the second board 1271 may face the second unit main board 1320. The outer surface of the second board 1271 may face the third unit main board 1330.

In addition, the first sub-board 1154*a* may be connected to the second sub-board 1154*b* and the third sub-board 1154*c* disposed on the side surfaces of the first camera actuator.

The third coil 1152*c* may be disposed on the first sub-board 1154*a* according to the embodiment. In addition, the first coil 1152*a* may be disposed on the second sub-board 1154*b*. In addition, the second coil 1152*b* may be disposed on the first sub-board 1154*a*.

In addition, the outer surface of the second sub-board 1154*b* may face the inner surface of the third unit main board 1330. In addition, at least a portion of the second sub-board 1154*b* may come into contact with the third unit main board 1330.

The second board unit 1270 may include the first exposed area EA1 exposed by the main board unit 1310. In addition, the second board unit 1270 may include a first unexposed area UEA1 other than the first exposed area EA1. For example, the second board 1271 may include the first exposed area EA1. The first unexposed area UEA1 may be an area in which the second board unit 1270 overlaps the third unit main board 1330 (or the second unit main board 1320) in the second direction (Y-axis direction).

In addition, the second main terminal part (or the third main terminal part) SG1 may be disposed outside the second board unit 1270. Furthermore, the second main terminal part (or the third main terminal part) SG1 may be disposed in the first exposed area EA1. The outer surface of the second main terminal part (or the third main terminal part) SG1 may be convex inward or concave outward. With this configuration, the conductive member SD may be easily filled into the second main terminal part (or the third main terminal part) SG1.

In addition, the second terminal part (or the third terminal part) SG2 may be disposed inside the second main terminal part (or the third main terminal part) SG1. For example, the second terminal part (or the third terminal part) SG2 may be disposed under the second main terminal part (or the third main terminal part) SG1. The second main terminal part (or the third main terminal part) SG1 may overlap the second terminal part (or the third terminal part) SG2 in the second direction (Y-axis direction).

The length of the second main terminal part (or the third main terminal part) SG1 in the first direction (X-axis direction) may be smaller than the length of the second terminal part (or the third terminal part) SG2 in the first direction (X-axis direction). With this configuration, when the conductive member SD is applied to the second main terminal part (or the third main terminal part) SG1 and the second terminal part (or the third terminal part) SG2, the conductive member SD may not flow down therein. Furthermore, the second main terminal part (or the third main terminal part) SG1 and the second terminal part (or the third terminal part) SG2 may be easily coupled by the conductive member SD.

The conductive member SD may have a concave groove in the first direction to surround the second main terminal part (or the third main terminal part) SG1 that is convex in the first direction positioned on both surfaces (board inner surface and board outer surface) of the second unit main board 1320. With this configuration, it is possible to increase the bonding strength according to the bonding process. Furthermore, it is possible to prevent the flowing down of the conductive member.

The second terminal part (or the third terminal part) SG2 may be disposed on the second board 1271. Furthermore, the second terminal part (or the third terminal part) SG2 may be disposed adjacent to the second main terminal part (or the third main terminal part) SG1. In addition, at least a portion of the second board unit (third board 1272) may overlap the second main terminal part (or the third main terminal part) SG1 in the vertical direction or the second terminal part (or the third terminal part) SG2 in the first direction (X-axis direction).

In addition, the second main terminal part (or the third main terminal part) SG1 may be disposed outside the second terminal part (or the third terminal part) SG2. Furthermore, the second terminal part (or the third terminal part) SG2 may be disposed in the first exposed area EA1 and the first unexposed area UEA1. In addition, the first terminal part SG4 may be disposed in the second exposed area EA2 and the second unexposed area UEA2. Here, an inward direction between the boards or the bonding grooves may be a direction from the main board unit 1300 toward the first camera actuator or second camera actuator. Conversely, an outward direction may be a direction from the first camera actuator toward the main board or from the second camera actuator toward the main board.

In addition, as described above, the second unit main board 1320 may be disposed on the second board 1271 in the second direction (Y-axis direction). As described above, the outer surface of the second board 1271 may come into contact with the inner surface of the second unit main board 1320.

In addition, the second main terminal part (or the third main terminal part) SG1 may overlap the second terminal part (or the third terminal part) SG2 in the second direction (Y-axis direction). Furthermore, the second terminal part (or the third terminal part) SG2 may be disposed in the first exposed area of the third board 1272. However, the first exposed area may be misaligned with or may not overlap the second main terminal part (or the third main terminal part) SG1 in the second direction (Y-axis direction).

Therefore, the conductive member SD may be disposed on the second main terminal part (or the third main terminal part) SG1 and the second terminal part (or the third terminal part) SG2. Furthermore, the conductive member SD may be disposed on the second main terminal part (or the third main terminal part) SG1 positioned on the board outer surface of the second unit main board 1320. In addition, the conductive member SD may be disposed between the second main terminal part (or the third main terminal part) SG1 and the second terminal part (or the third terminal part) SG2 positioned on the board inner surface of the second unit main board 1320.

Furthermore, in order to prevent the open circuit of the electrical connection between the second board 1271 and the second unit main board 1320, a protective cover may be positioned outside the second main terminal part (or the third main terminal part) SG1 and the conductive member SD. For example, a protective member may be positioned outside at least one of the plurality of second main terminal parts (or third main terminal parts) SG1 and the plurality of conductive members SD. Therefore, the protective member can prevent damage to the conductive member SD due to an external impact.

Figure 30:
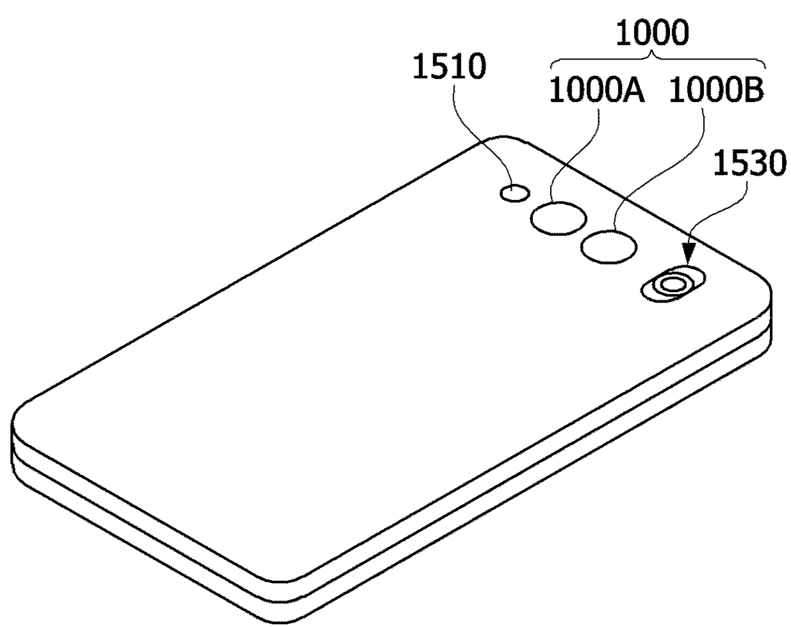
FIG. 30 is a perspective view of a mobile terminal to which the camera device according to the embodiment is applied.

FIG. 30 is a perspective view of a mobile terminal to which the camera device according to the embodiment is applied.

Referring to FIG. 30, a mobile terminal 1500 according to the embodiment may include the camera device 1000, a flash module 1530, and an AF device 1510, which are provided on a rear surface thereof.

The camera device 1000 may include an image photographing function and an AF function. For example, the camera device 1000 may include the AF function using an image.

The camera device 1000 processes an image frame of a still image or a moving image obtained by an image sensor in a photographing mode or a video call mode.

The processed image frame may be displayed on a predetermined display and stored in a memory. A camera (not illustrated) may also be disposed on a front surface of a body of the mobile terminal.

For example, the camera device 1000 may include a first camera device 1000A and a second camera device 1000B, and the first camera device 1000A may implement an OIS function together with an AF or zooming function. In addition, the second camera device 1000B may implement the AF, zooming, and OIS functions. In this case, since the first camera device 1000A includes both the above-described first camera actuator and second camera actuator, it is possible to easily miniaturize the camera device by changing an optical path.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition in which the AF function using the image of the camera device 1000 is degraded, for example, in an environment that is close to 10 m or less or dark.

The AF device 1510 may include a light emitting unit including a vertical cavity surface emitting laser (VCSEL)

semiconductor device and a light receiving unit for converting light energy into electrical energy, such as a photodiode.

Figure 31:
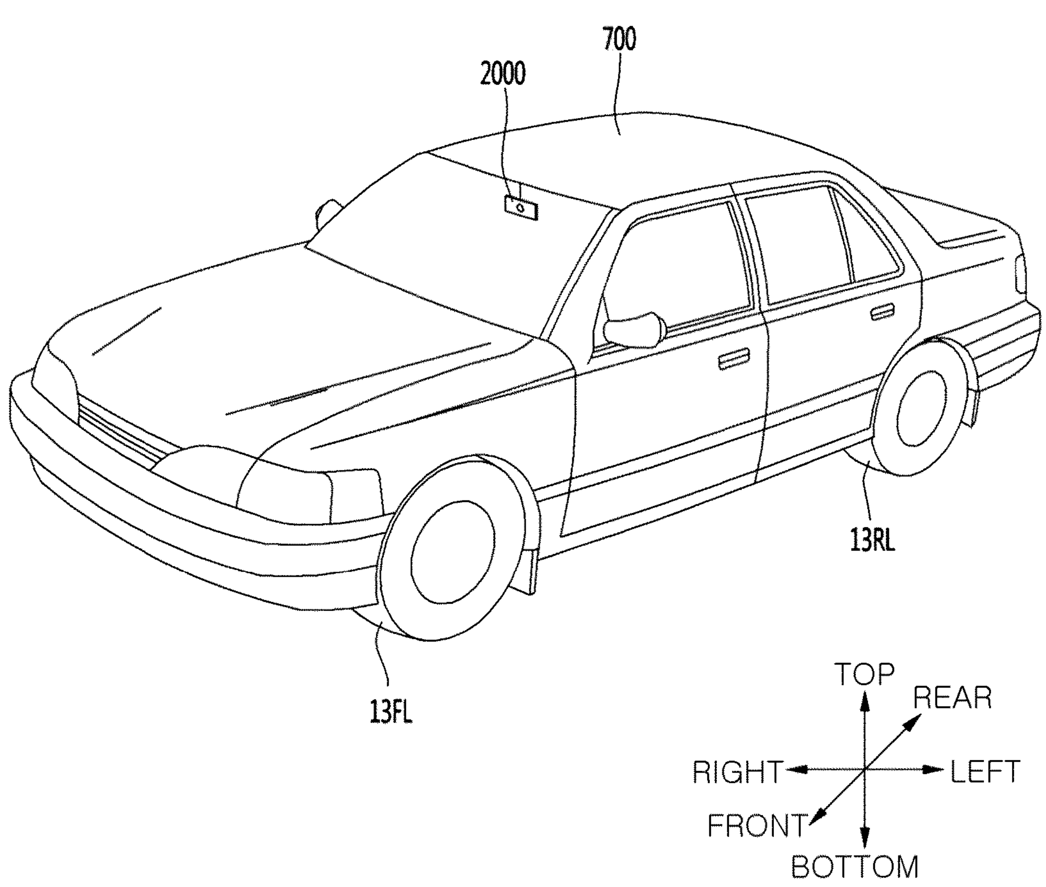
FIG. 31 is a perspective view of a vehicle to which the camera device according to the embodiment is applied.

FIG. 31 is a perspective view of a vehicle to which the camera device according to the embodiment is applied.

For example, FIG. 31 is a view illustrating an exterior of a vehicle including a vehicle driver assistance device to which the camera device 1000 according to the embodiment is applied.

Referring to FIG. 31, a vehicle 700 according to the embodiment may include wheels 13FL and 13FR rotated by a power source and a predetermined sensor. Although the sensor may be a camera sensor 2000, the present invention is not limited thereto.

The camera sensor 2000 may be a camera sensor to which the camera device 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 2000, the processor may detect the object and include the detected object in the image information. In this case, the processor may further supplement the image information by acquiring information on a distance from the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 2000 may include a stereo camera in order to improve the measurement accuracy of the object and further secure information such as a distance between the vehicle 700 and the object, but the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera device comprising:

a first actuator including a first board having a first terminal part;

a second actuator coupled to the first actuator and including a second board and a third board; and a main board including a first unit main board on which an image sensor is disposed, and a second unit main board disposed to correspond to the first board, wherein the second board includes a second terminal part, wherein the second unit main board includes a first main terminal part formed at a position of the first terminal part, and a second main terminal part formed at a position corresponding to the second terminal part, wherein the first main terminal part is soldered to the first terminal part, wherein the second main terminal part is soldered to the second terminal part, and wherein the second unit main board is disposed on a first side portion of the first actuator and the second actuator.

2. The camera device of claim 1, wherein a third terminal part is disposed on the third board.

3. The camera device of claim 2, wherein the main board includes a third unit main board disposed to correspond to the third board, and wherein the third unit main board includes a third main terminal part soldered to the third terminal part.

4. The camera device of claim 1, wherein the second unit main board extends perpendicular to the first unit main board.

5. The camera device of claim 4, comprising a third unit main board facing the second unit main board, wherein the third unit main board is disposed on a second side portion of the first actuator.

6. The camera device of claim 1, wherein the first main terminal part is positioned on a surface opposite to a surface facing an outer surface of the first side portion of the first actuator, and wherein the second main terminal part is positioned on a surface opposite to a surface facing an outer surface of the first side portion of the second actuator.

7. The camera device of claim 5, wherein the first actuator is coupled to a prism, and wherein the second actuator is coupled to a lens.

8. The camera device of claim 7, wherein the second main terminal part exposes a portion of the second terminal part.

9. The camera device of claim 1, further comprising, an electrically conductive member electrically connecting the second main terminal part to the second terminal part.

10. The camera device of claim 1, wherein the first main terminal part is connected to the first terminal part by a connector.

11. The camera device of claim 7, wherein the second unit main board includes a second side surface area in contact with the first board unit in the optical axis direction, a first side surface area in contact with the second board part in the optical axis direction, and a connecting area disposed between the first side surface area and the second side surface area.

12. The camera device of claim 11, wherein the connecting area is formed of a flexible printed circuit board and has a step inward.

13. The camera device of claim 1, wherein an area of the second unit main board overlapping the second board is larger than an area of the second unit main board not overlapping the second board.

14. The camera device of claim 7, wherein the first main terminal part is connected to the first terminal part by a connector.

* * * * *